(12) United States Patent
Forbes

(10) Patent No.: US 10,077,088 B1
(45) Date of Patent: Sep. 18, 2018

(54) LONG-TRAVEL TRACK CARRIAGE AND RISING-RATE SUSPENSION MECHANISM FOR A TRACK-DRIVEN LAND VEHICLE

(71) Applicant: Vernal DeLloy Forbes, Boise, ID (US)

(72) Inventor: Vernal DeLloy Forbes, Boise, ID (US)

( * ) Notice: Subject to any disclaimer, the term of this patent is extended or adjusted under 35 U.S.C. 154(b) by 0 days.

(21) Appl. No.: 15/644,738

(22) Filed: Jul. 8, 2017

(51) Int. Cl.
  *B62M 27/02* (2006.01)
  *B62D 55/104* (2006.01)

(52) U.S. Cl.
  CPC ........... *B62D 55/104* (2013.01); *B62M 27/02* (2013.01); *B62M 2027/026* (2013.01)

(58) Field of Classification Search
  CPC .......... B62D 55/104; B62M 2027/021; B62M 2027/022; B62M 2027/026
  See application file for complete search history.

(56) References Cited

U.S. PATENT DOCUMENTS

| | | | | |
|---|---|---|---|---|
| 4,613,006 A * | 9/1986 | Moss | ...................... | B62K 13/00 180/184 |
| 5,203,424 A * | 4/1993 | Gogo | ...................... | B62K 13/00 180/190 |
| 5,474,146 A * | 12/1995 | Yoshioka | ............... | B62K 13/00 180/184 |
| 6,112,840 A * | 9/2000 | Forbes | .................... | B62K 3/002 180/191 |
| 7,182,165 B1 * | 2/2007 | Keinath | .................. | B62M 27/02 180/185 |
| 2003/0159868 A1 * | 8/2003 | Alexander | ............. | B62M 27/02 180/190 |
| 2008/0017431 A1 * | 1/2008 | Sadakuni | ............... | B62D 55/07 180/193 |
| 2012/0222908 A1 * | 9/2012 | Mangum | ................ | B62D 55/04 180/193 |
| 2016/0167722 A1 * | 6/2016 | Anderson | ............ | B62D 55/108 180/9.54 |
| 2017/0129569 A1 * | 5/2017 | Mangum | ................ | B62M 27/02 |
| 2018/0111662 A1 * | 4/2018 | Ball | ........................ | B62M 27/02 |

* cited by examiner

*Primary Examiner* — Tony H Winner

(57) ABSTRACT

A long-travel continuously-rising-rate track carriage and suspension mechanism for motive drive and cushioned support of a tracked land vehicle upon a ground-contacting lower run of an endless-loop track. A present practical application of the invention is to convert a motorcycle into a snowbike for over-snow use wherein the rear wheel and swingarm of the motorcycle are replaced by the track carriage and suspension mechanism of the present invention and the front wheel is replaced by one or more skis. The unique long-travel rising-rate track suspension is accomplished employing a single swingarm connected pivotally between the vehicle chassis and a track skid, and using a bell crank and connecting rod to provide progressive actuation of a shock absorber upon compression of the track suspension. The track is carried and driven by components mounted to the single swingarm.

29 Claims, 18 Drawing Sheets

LONG-TRAVEL TRACK CARRIAGE AND RISING-RATE SUSPENSION MECHANISM FOR A TRACK-DRIVEN LAND VEHICLE

BACKGROUND OF THE INVENTION

Snowbikes have become increasingly popular and ubiquitous for over-snow recreation over the past 10 years. Several manufacturers have designed, produced and marketed snowbike conversion systems ("kits") to allow the seasonal conversion of motorcycles into snowbikes that ride and handle like motorcycles when ridden on snow. These motorcycle-like riding and handling characteristics have engendered a new powersport recreation genre with rapidly-growing popularity.

The majority of present snowbike kit designs employ track suspension designs previously used in snowmobiles. These snowbike kit designs typically utilize a suspension "tunnel" like a snowmobile that is an accessory frame that is rigidly mounted to the motorcycle chassis swingarm and shock absorber mounts to extend rearward from the motorcycle chassis. This frame mounts to the motorcycle chassis to form a rigid frame under which the track skid and suspension are deployed. Most of these snowmobile-like designs employ a parallelogram suspension configuration with one of the legs of the parallelogram having a variable length with minimum and maximum length limits. This allows the track skid to incline and decline relative the snowbike chassis to allow the track to maintain tractional compliance with the snow. An example of this style of snowbike suspension is disclosed in U.S. Pat. No. 8,910,738 {Mangum}.

These snowmobile-type suspension configurations typically limit the suspension compression to only 7 or 8 inches of travel at the forward end of their track skids. Additionally, the nature of these collapsing parallelogram suspensions yields a falling-rate suspension where the rate of shock absorber compression relative to the track skid compression decreases as the track suspension is compressed. This typically results in harsh bottoming of the track suspension when traversing very rough terrain or landing from jumping.

To remedy these shortcomings, some snowbike kit manufacturers have offered accessory shock absorbers that can replace the solid link connecting the tunnel frame to the motorcycle chassis shock mount. This additional shock absorber allows the track tunnel to rotate upward on the motorcycle chassis swingarm pivot to increase the track suspension range. While the geometry of the deployment of this additional shock absorber provides a slightly rising-rate compression of this additional accessory shock absorber, when combined with the under-tunnel track skid suspension, the net overall result is an overall generally-discontinuous falling-rate suspension.

Another style of snowbike conversion kit has been disclosed and described by the inventor of the present invention in U.S. Pat. Nos. 6,112,840, 6,321,864, 6,382,338 and 6,431,301 {Forbes}. This style utilizes a smaller track carriage having track drive sprockets at the rear of the track carriage frame and track idler wheels at the forward end, with the track circulating a constant path around the track carriage and being driven from the rear of the track carriage. A single articulating swingarm connects between the motorcycle swingarm pivot mount and the rear of the track carriage such that the track carriage such that the track carriage rises in scissors-fashion under the swingarm as the track suspension becomes compressed. The track carriage receives suspension cushioning force from the swingarm at the rear of the track carriage, and from a link connected to a bell crank lever (arm) to the front of the track carriage. A shock absorber is deployed between the shock absorber mount on the frame of the motorcycle and another arm of the bell crank such that the bell crank apportions the suspension cushioning force from the shock absorber to the swingarm and to the bell crank-connected link to the forward end of the track carriage. The drawbacks encountered in the product implementation of this design are first, the track is too short and too narrow, resulting in a track "footprint" too small for adequate floatation on soft snow, and second, the track suspension, while slightly progressive (or rising-rate), is of limited travel and lacks adequate progressivity of the suspension rate to provide the desired plushness of ride, and, like much of the other prior art, suffers from harsh bottoming of the track suspension.

Snowbike conversion kits are generally adapted to off-road racing corn petition-type motorcycles that are relatively light weight, have high horsepower-to-weight ratios, and have long travel front and rear wheel suspensions. As a result of many decades of design evolution, the rear wheel suspensions of these modern off-road motorcycles have continuously rising-rate ("progressive") compression of their shock absorbers to provide nearly optimal suspension performance when riding over rough terrain and in landing from jumping. Off-road motorcycle owners who seasonally convert their motorcycles into snowbikes desire and seek the same suspension characteristics in their snowbikes that they enjoy in wheeled dirt bike configuration. Thus, the ideal snowbike track suspension will closely emulate the rising-rate suspension characteristics and performance of the rear wheel suspension of the host motorcycle.

BRIEF SUMMARY OF THE INVENTION

The present invention embodies a track suspension for a track-propelled snow vehicle or other track-propelled land vehicle, and in the present embodiment, to a snowbike track carriage and suspension mechanism providing a long-travel rising-rate suspension of the snow vehicle upon the lower run of the track.

The object of the present invention is a lightweight snowbike conversion track carriage and track suspension mechanism that closely emulates the rear wheel suspension of the host motorcycle—both the amount of suspension travel and rising-rate suspension characteristics. The present invention is capable of providing over 12 inches of suspension travel at the forward end of the track skid and in excess of 17 inches of suspension travel at the track skid rearward end with continuously-progressive shock absorber compression throughout the entire suspension travel.

The track suspension mechanism comprises a track skid frame, a single rigid swingarm pivotally connecting between a vehicle chassis swingarm mount and the track skid frame, a pair of track drive wheels mounted rotatingly to the swingarm, and an endless-loop track that circulates around the track drive wheel and thence rearward beneath the track skid frame with all components carrying, driving and bearing upon the track being mounted to the swingarm only. The track skid frame rotates upon a single pivot connection to the lower end of the single rigid swingarm to allow it to pivotally incline and decline relative to the swingarm, and thus to the vehicle chassis. A track suspension cushion mechanism provides cushioned support of the vehicle chassis upon the track skid frame. A strategic location of the pivotal mounting of the track skid frame to the swingarm results in a practically non-varying track path length throughout the full range of motion of the track suspension, thus allowing the track tension to be minimal for maximum power transfer efficiency.

The track suspension cushion mechanism is deployed between land vehicle chassis and the track skid, and comprises a resilient shock absorber and a linkage that comprises a bell crank and one or more connecting rods. This track suspension cushion mechanism yields an increasing rate of compression of the shock absorber relative to the compression of the track skid suspension beneath the vehicle. The bell crank fulcrum is rotatingly mounted to the swingarm and one or more connecting rods pivotally connect between a primary arm of the bell crank and a vehicle chassis suspension mount that is displaced from the vehicle chassis swingarm mount. The shock absorber pivotally connects either directly to the swingarm or alternately through a transfer linkage to the track skid at a track skid suspension mount that is displaced from the track skid swingarm mount operative to optimally center the track weighting distribution forward of the track skid swingarm pivot mount.

DETAILED DESCRIPTION OF THE INVENTION

Figure 1:
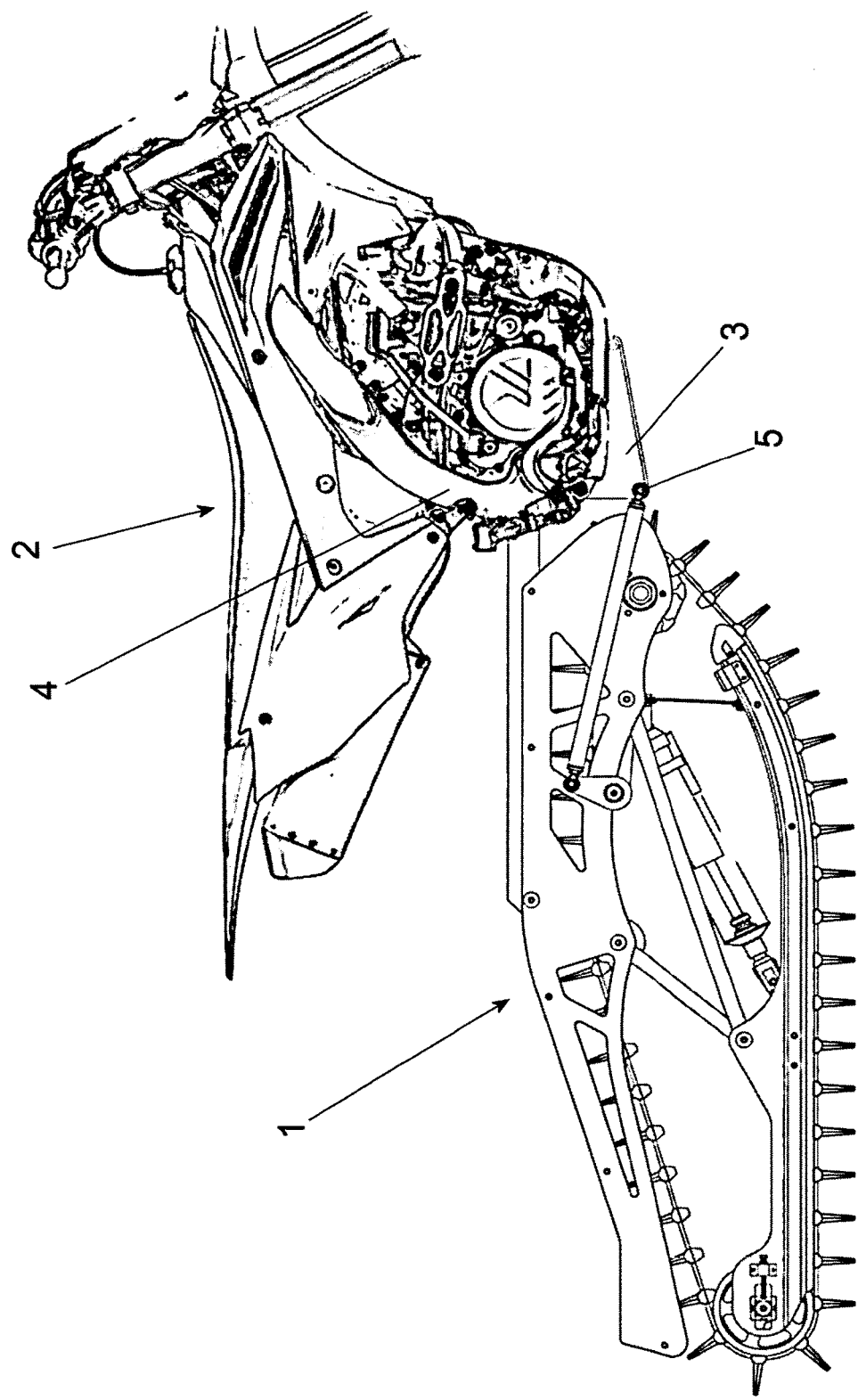
FIG. 1 is a right side view of the track carriage and suspension mechanism first embodiment of the present invention illustrating the prescribed attachment of the mechanism to the chassis of a motorcycle to convert it to over-snow use wherein the rear wheel and swingarm of the motorcycle are replaced with the first embodiment track carriage and suspension mechanism.

Since the present invention is being herein disclosed in multiple embodiments, it is to be understood that these presented embodiments are not intended to limit the application of the invention to other embodiments. The embodiments herein described specifically describe application of the present invention to use as a snowbike conversion mechanism for the purpose of seasonally converting a motorcycle to over-snow use. The present invention can be applied in alternate embodiments for use in a multitude of track-driven vehicles, and the invention is intended to cover all modifications, alternative constructions or alternate embodiments falling within the scope of the invention as defined in the claims.

In a first snowbike conversion kit embodiment presented herein (initially illustrated in FIG. 1), a track carriage and suspension mechanism 1 embodying the present invention is mounted to the chassis 4 of a motorcycle 2 in place of the motorcycle rear wheel and swingarm. A chassis suspension mount frame 3 is firmly attached to the motorcycle chassis 4 to provide outboard suspension pivot mounts 5 located laterally outboard of each side of the motorcycle chassis 4 as though these outboard suspension pivot mounts were integral with the motorcycle chassis.

Figure 2:
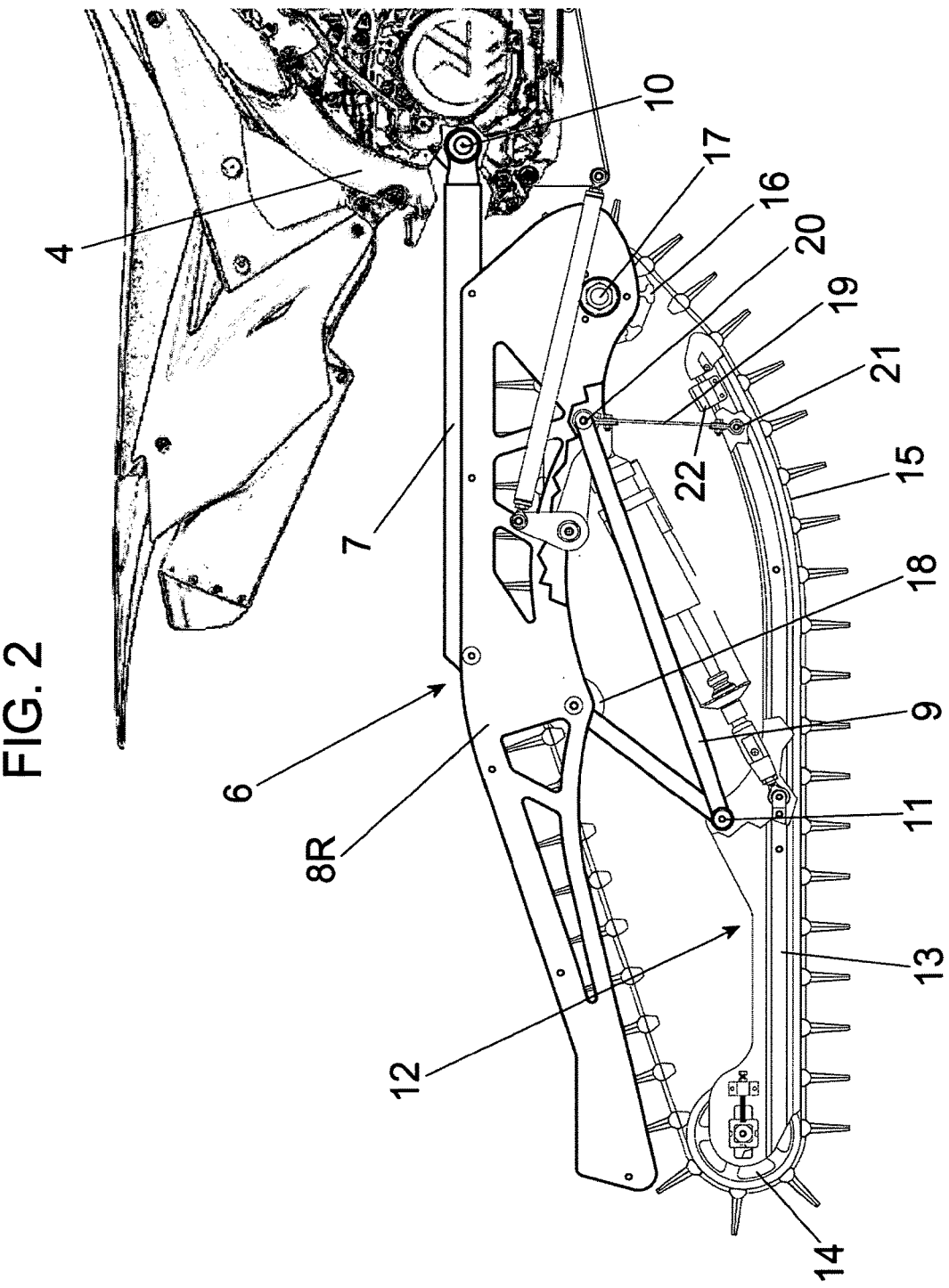
FIG. 2 is a partial right side view of the first embodiment of the present invention illustrating the single rigid swingarm assembly in bold outline.

Referring now to FIG. 2, a rigid swingarm frame assembly 6 (illustrated with bolder outline) comprises a swingarm upper frame 7, a left side plate 8L (not visible in this right-side view), a right side plate 8R and a lower strut frame 9 all solidly affixed together. The rigid swingarm frame assembly 6 has a swingarm chassis pivot 10 that pivotally mounts to the motorcycle chassis 4 and a track skid pivot 11 that pivotally mounts to a track skid 12. Track skid 12 comprises one or more track rails 13, one or more rear idler wheels 14, and in the case of multiple track rails, cross braces and axles as necessary to combine the track rails and idler wheels into a rigid track skid assembly. Track skid 12 bears and slides upon a lower run of an endless-loop track 15. Endless-loop track 15 is driven by one or more track drive sprockets 16 mounted on a drive axle 17 that receives motive power from the motorcycle engine and braking force from a brake mechanism (not shown). The drive axle 17 rotates upon bearings mounted to left side plate 8L and right side plate 8R of swingarm assembly 6. The endless loop track 15 circulates around track drive sprockets 16, beneath track skid 12, around a pair of rear idler wheels 14, and over a pair of upper track support idlers 18 that are mounted on an axle supported between left side plate 8L and right side plate 8R.

Track skid 12 pivots upon track skid pivot 11 of rigid swingarm 6 to allow track skid 12 to incline and decline relative to rigid swingarm assembly 6, and thus relative to the motorcycle chassis 4. A limiter strap 19 connects between an upper cross rod 20 that is mounted between left side plate 8L and right side plate 8R, and a forward cross rod 21 mounted between the pair of track rails 13 to limit the track skid declination when limiter strap 19 becomes fully extended. Track rail bumpers 22 are mounted to the forward ends of track rails 13 and contact against upper cross rod 20 under rotation of track skid 12 upon track skid pivot 11 to limit the inclination of the forward end of track skid 12 beneath swingarm frame 6. Track skid pivot 11 is strategically mounted at a location on track skid 12 such that the path length of the belt of endless-loop track 15 remains practically constant throughout the entire range of allowed incline/decline motion of track skid 12 under swingarm assembly 6. This strategic mounting location of track skid pivot 11 is a geometric function of the diameters and locations of the axes of rotation of the track drive sprockets 16 and upper track support idlers 18, the diameter and location of rear idlers 14 on track skid 12, and the location and curvature of the front of track slides 13. These geometric factors (parameters) define both the track belt path length and also the variability of that track belt path length through the allowed range of motion of track skid 12 relative to rigid swingarm 6. The only track suspension motion of track skid 12 relative to the swingarm frame 6 that is allowed is its rotation upon track skid pivot 11 between the inclination limit and declination limit described above.

Figure 3:
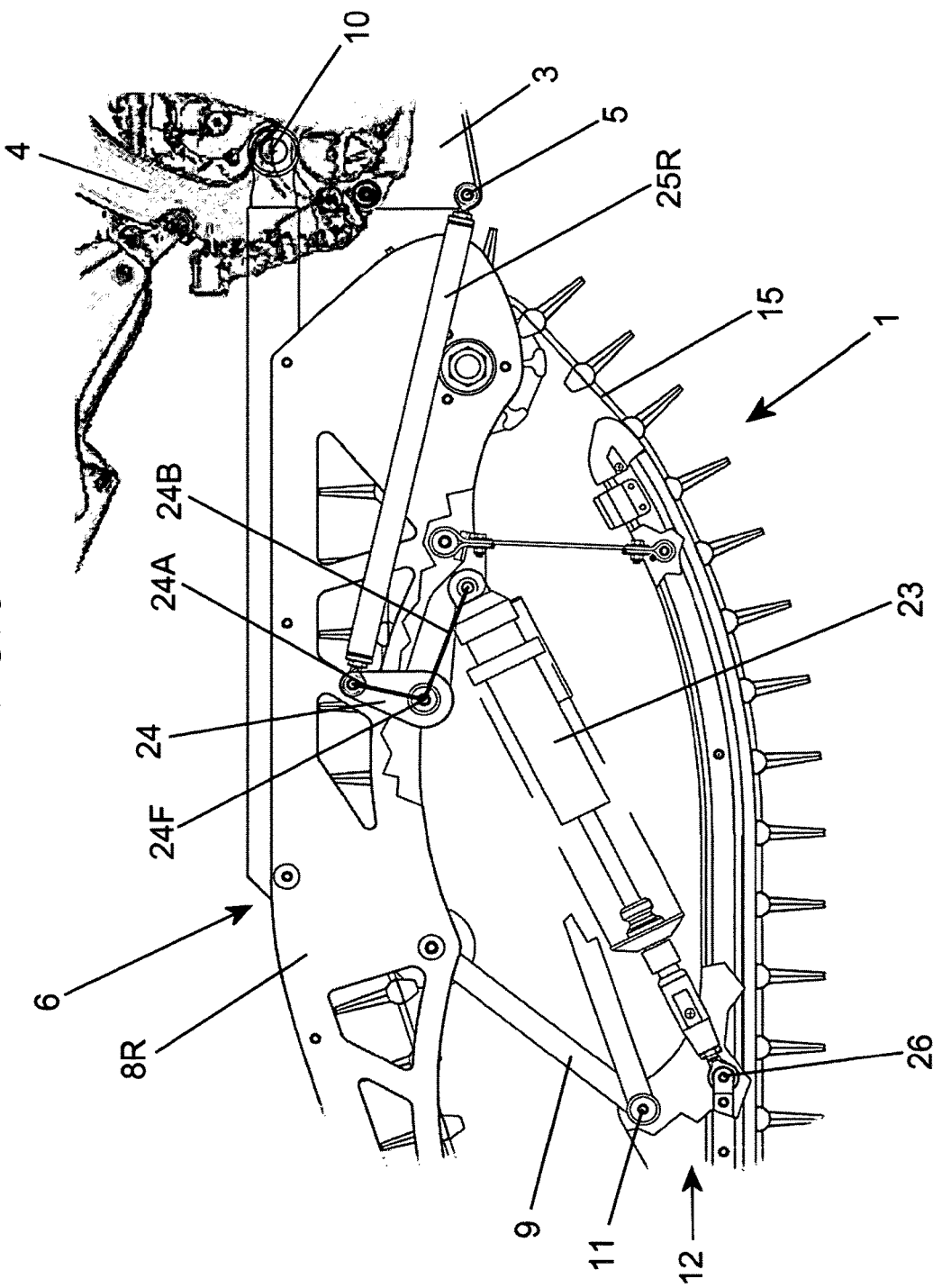
FIG. 3 is a partial right side view of the first embodiment showing the track carriage and suspension mechanism shock absorber, bell crank and track suspension rods with their interconnections and pivotal connections to the vehicle chassis, swingarm assembly and track skid.

FIG. 3 is a partial view of the invention embodiment illustrated in FIG. 1 and FIG. 2, additionally showing a section of the forward portion of lower strut frame 9 and a section of right side plate 8R cut away solely for the purpose of illustrating the function of the track (assembly) suspension. The track suspension comprises a shock absorber 23, a bell crank 24 and a pair of track suspension rods 25L (not visible in this view) and 25R located outboard respectively on the left side and right side of track carriage and suspension mechanism 1. Bell crank 24 has a bell crank fulcrum pivot 24F rotatably mounted between left side plate 8L and right side plate 8R, a pair of bell crank arms 24A outboard of side plates 8L and 8R, and a center bell crank arm 24B. Bell crank arms 24A and 24B are additionally illustrated with straight bold lines between the pivot axis of the bell crank fulcrum pivot 24F and their individual arm pivots for the purpose of illustrating the angular relationship between bell crank arms 24A and 24B. Track suspension rods 25L and 25R connect pivotally between outboard suspension pivot mounts 5 of chassis suspension mount frame 3 and outboard bell crank arms 24A. Shock absorber 23 is pivotally deployed between center bell crank arm 24B and a track skid suspension pivot 26 of track skid 12. Shock absorber 23 would typically comprise an interior hydraulic dashpot damper mechanism, an external coil spring (herein illustrated with dotted lines only), internal extension and compression stops, and pivot bearings at each end. Shock absorber 23 could also comprise other variations of construction to serve the same purpose and function of a damped resilient cushion.

In operation, the track suspension mechanism comprising elements 23-25 provide resilient damped force to suspend and cushion the vehicle chassis 4 upon track skid 12 and thereby upon the ground-contacting run of endless-loop track 15. As the weight and inertia of motorcycle 2 and its rider compress the track suspension, rigid swingarm frame assembly 6 rotates upward upon swingarm chassis pivot 10, thereby causing suspension rods 25L and 25R to pull bell crank arms 24A rotatingly forward. Because bell crank arms 24A and 24B are rigidly joined as members of bell crank 24, the rotation of bell crank 24 results in the compression of shock absorber 23 between bell crank arm 24B and track skid compression mount 26 which is located forward and below track skid pivot 11. Because endless-loop track 15 is bearing upon the ground surface, track skid 12 maintains the same orientation to the ground, and the angle between the swingarm frame assembly 6 and track skid 12 decreases, thus adding to the compression of shock absorber 23.

Figure 4:
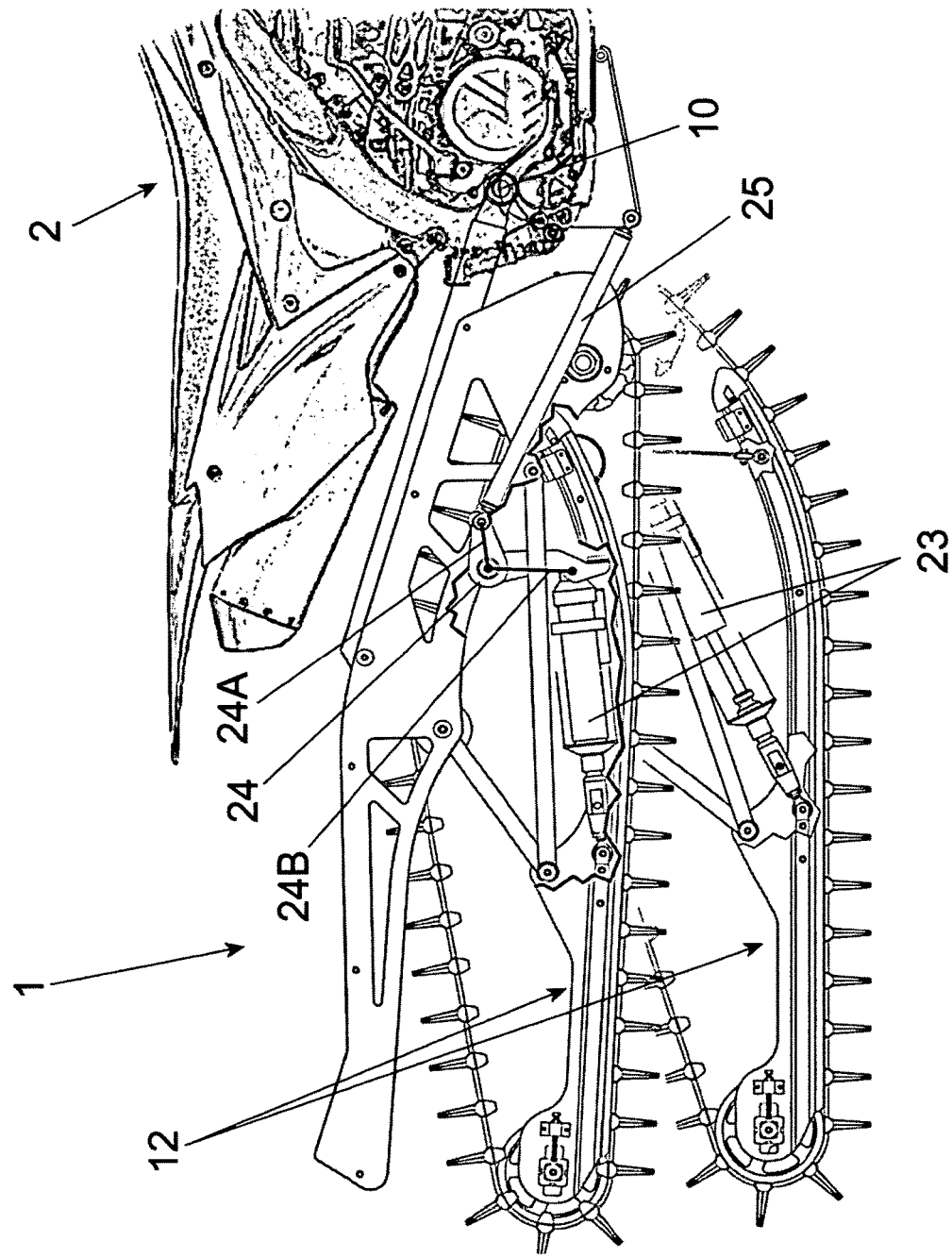
FIG. 4 is a right side view of the first embodiment of the present invention showing the track suspension fully compressed (fully loaded) juxtaposed over the track carriage and suspension mechanism fully extended (unloaded) to illustrate the amount of suspension travel and the suspension mechanism function.

As viewed in FIG. 3 showing the track suspension extended (not compressed), the angle between bell crank arms 24A (shown as a bold line) and the longitudinal axes of suspension rods 25L,R is nearly a right angle. As the track suspension becomes compressed under the weight and inertia of motorcycle and rider, this angle becomes increasingly obtuse. Thus, as the track suspension is compressed, the rate of rotation of bell crank 24 progressively increases proportional to the arcsine of the angle between the bell crank arms 24A and the suspension rods 25L,R. Similarly, the initial angle between the axis of bell crank arm 24B (also illustrated with a bold line) and the longitudinal axis of shock absorber 23 becomes less acute as the track suspension is compressed. This results in a progressive rate of compression of shock absorber 23 as the track suspension is compressed. This is illustrated in FIG. 4 which illustrates the suspension of track carriage and suspension mechanism 1 fully compressed overlaying a partially-hidden view of track carriage and suspension mechanism 1 with the suspension fully extended. When the track carriage and suspension mechanism suspension is fully compressed, the angle between bell crank arms 24A and suspension rods 25 becomes quite obtuse, while the acute angle between bell crank arm 24B and the longitudinal axis of shock absorber 23 increases to approach 90 degrees where shock absorber 23 becomes maximally compressed. The combined geometric result is a continuously rising-rate long-travel track suspension offering a very supple "ride" for the snowbike and rider that becomes progressively stiffer as the track suspension becomes compressed. This suspension characteristic closely emulates the rear wheel suspension rate and characteristics of the host motorcycle, and even allows the shock absorber of the host motorcycle to be deployed as shock absorber 23, thus providing the same tuned suspension damping characteristics as for the host motorcycle with wheels.

Figure 5:
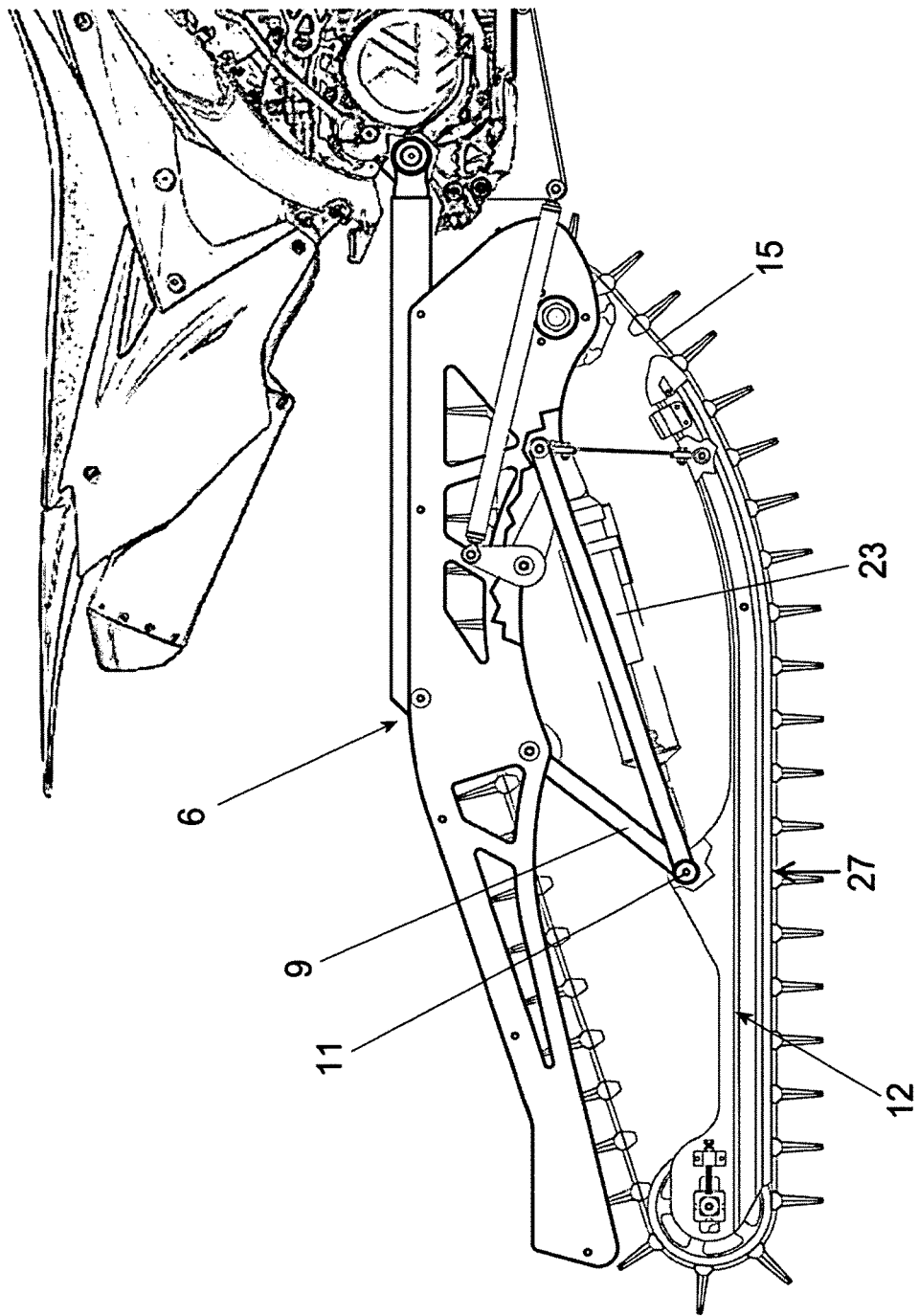
FIG. 5 is partial right side view of the first embodiment of the present invention showing an alternate mounting of the shock absorber to the swingarm assembly frame rather than the track skid with the resultant center of track weighting indicated.
Figure 6:
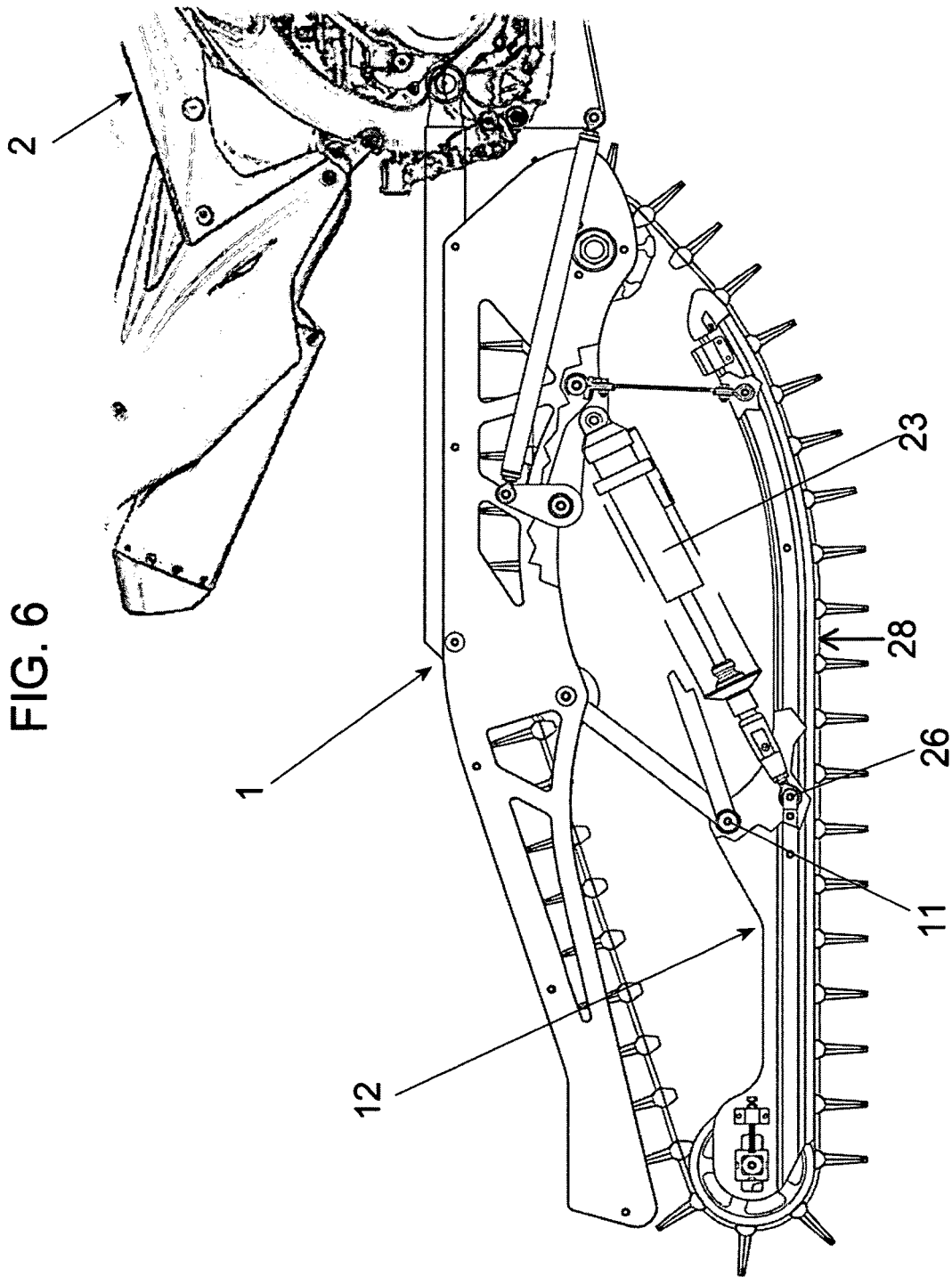
FIG. 6 is a partial right side view of the first embodiment of the present invention with the shock absorber mounting as illustrated in previous FIGS. 1-4 additionally indicating the track weighting center of this configuration.

FIG. 5 illustrates a slight variation of this embodiment of the invention, with the difference from the configuration described previously in FIGS. 1-4 being the lower end of shock absorber 23 is pivotally attached to a lower portion of lower strut frame 9 of swingarm assembly 6. This configuration results in the same practically non-variable track belt path length and practically the same continuously-progressive track suspension as the previously-described configuration. This configuration, however, is perhaps less desirable for a snowbike application in that it places the center of the track weighting distribution (illustrated by an arrow 27) directly below track skid pivot 11 which is about midway along the length of the flat portion of track skid 12. The benefit of the previous configuration as shown again in FIG. 6 is that the center of track weighting distribution (also shown by an arrow 28) is located well forward of track skid pivot 11 nearer the front of the ground-contacting run of endless-loop track 15. This is due to the compression force of shock absorber 23 distributing directly to track skid suspension pivot 26 so as to create a torque couple on track skid 12 around track skid pivot 11 that forces the forward portion of track skid 12 downward, thus weighting the forward portion of track skid 12 more heavily. With this center of track weighting further forward, the track carriage and suspension mechanism 1 reacts more nearly like the rear wheel of the host motorcycle in turning, landing from jumps, and in traversing terrain with large closely-spaced surface undulations, often referred to by snowmobile, snowbike and motorcycle riders as "whoops".

Figure 7:
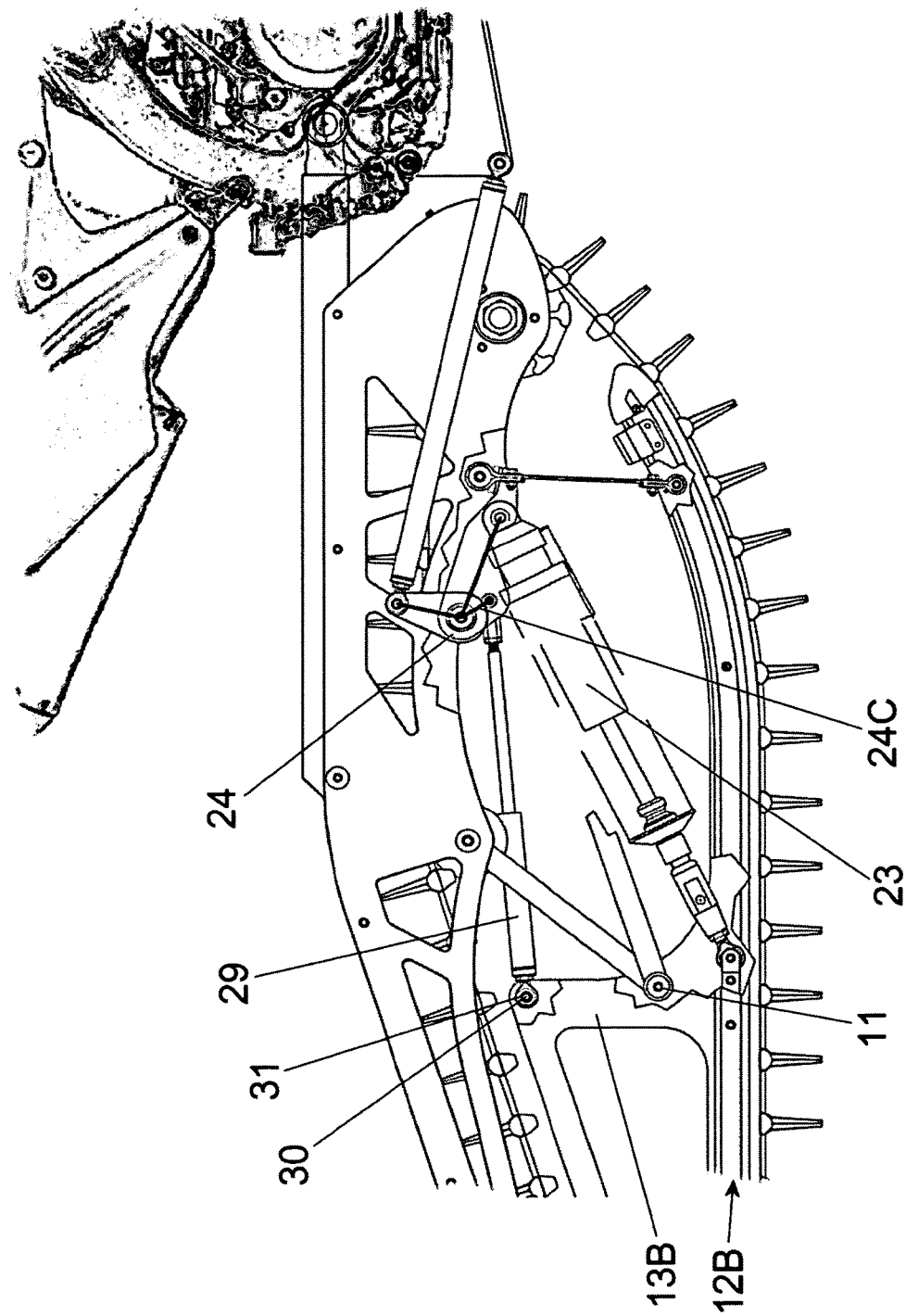
FIG. 7 is a partial right side view of the first embodiment of the present invention additionally illustrating an improvement adding a track attitude-leveling mechanism connecting between the bell crank and the track skid frame.

An variation to the first embodiment of a snowbike conversion kit previously herein presented is illustrated in FIG. 7. The track skid 12B of this configuration is slightly different from the previous track skid 12 in that track rails 13B comprise upward-extending members with attitude-leveling strut pivot mounts 30 near the upper extremities of the upward-extending members of track rails 13B. A track skid attitude-leveling strut 29 connects pivotally between a pivot connection to a bell crank arm 24C and a cross-rod 31 mounted between attitude-leveling strut pivot mounts 30 of track rails 13B. Track attitude-leveling strut 29 is variable in length having a minimum compressed length and a maximum extended length. One embodiment of track attitude-leveling strut 29 is illustrated with a view of its internal components in FIG. 8, and comprises a piston 33, a coil spring 34 that resists the compression of strut 29 from a centered position and a second coil spring 35 that resists the extension of strut 29 from a centered position. Compression of this embodiment of track-attitude-leveling strut 29 from its nominal length causes the piston 33 to compress compression spring 34, and extension of strut 29 from its nominal length causes piston 33 to compress extension spring 35. A spacer 36 compresses piston 33 between compression spring 34 and extension spring 35 to provide a desired amount of spring preload, and serves as a guide for the strut actuator rod 37. In operation (referring back to FIG. 7), as the track suspension is compressed, bell crank 24 rotates forcing bell crank arm 24C rearward. Bell crank arm 24C thus forces strut 29 rearward against attitude-leveling strut pivot mounts 30, urging track skid 12B to rotate around track skid pivot 11. The effect is to bias track skid 12B toward a level orientation relative the snowbike vehicle. Track attitude-leveling strut 29, by virtue of its variable length and cushioned compression and extension stops, allows track skid 12B to incline from a level orientation to motorcycle 2 a limited number of degrees as limited by the maximum compression of extension spring 35, and to decline from a level orientation to motorcycle 2 a limited number of degrees as limited by the maximum compression of compression spring 34 of track skid attitude-leveling strut 29.

Figure 9:
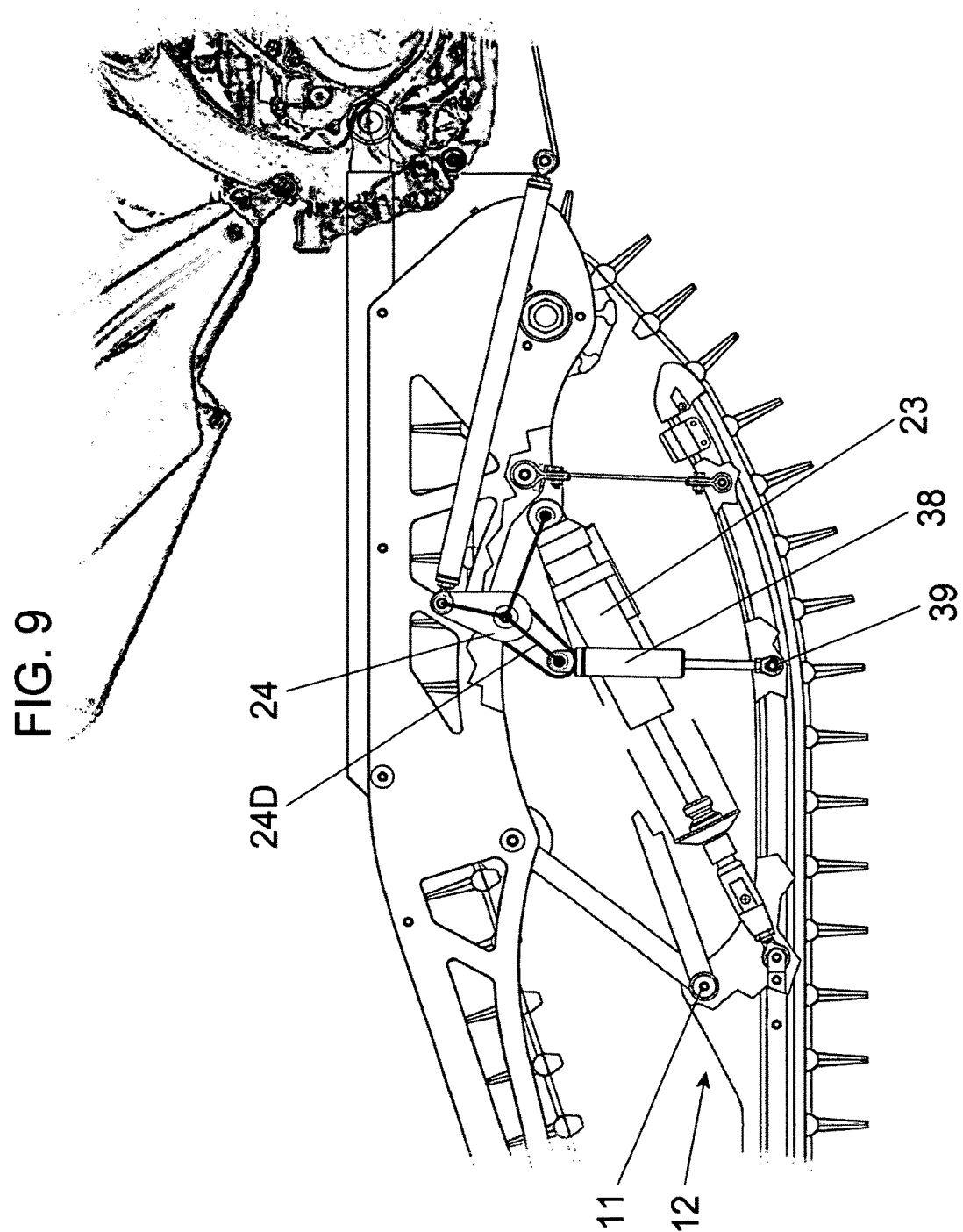
FIG. 9 is a partial right side view of the first embodiment of the present invention additionally illustrating an improvement adding a hydraulic damper mechanism connected between an additional arm of the bell crank and the track skid to dynamically bias the track attitude angle relative to the snow vehicle against rapid changes.

Another variation (addition) to this first embodiment of the present invention as previously disclosed in FIGS. 1-6 is presented in the illustration of FIG. 9. This configuration additionally comprises a hydraulic damper 38, a third arm 24D of bell crank 24 and a damper pivot mount 39 of track skid 12. In this illustration, bell crank third arm 24D has an arm axis represented by a bold line as in previous illustrations. Hydraulic damper 38 is pivotally connected between bell crank arm 24D and damper pivot mount 39 of track skid 12 at a location displaced from track skid pivot 11. While damper 38 does not statically bias track skid 12 to a level attitude relative to the vehicle, it does dynamically bias track skid 12 to retain the track skid attitude most recently forced to. Thus, damper 38 serves to dampen rapid inclination and declination of the attitude of track skid 12, and with properly-tuned damping characteristics, can serve to enhance the ride stability and comfort of the snowbike.

Figure 10:
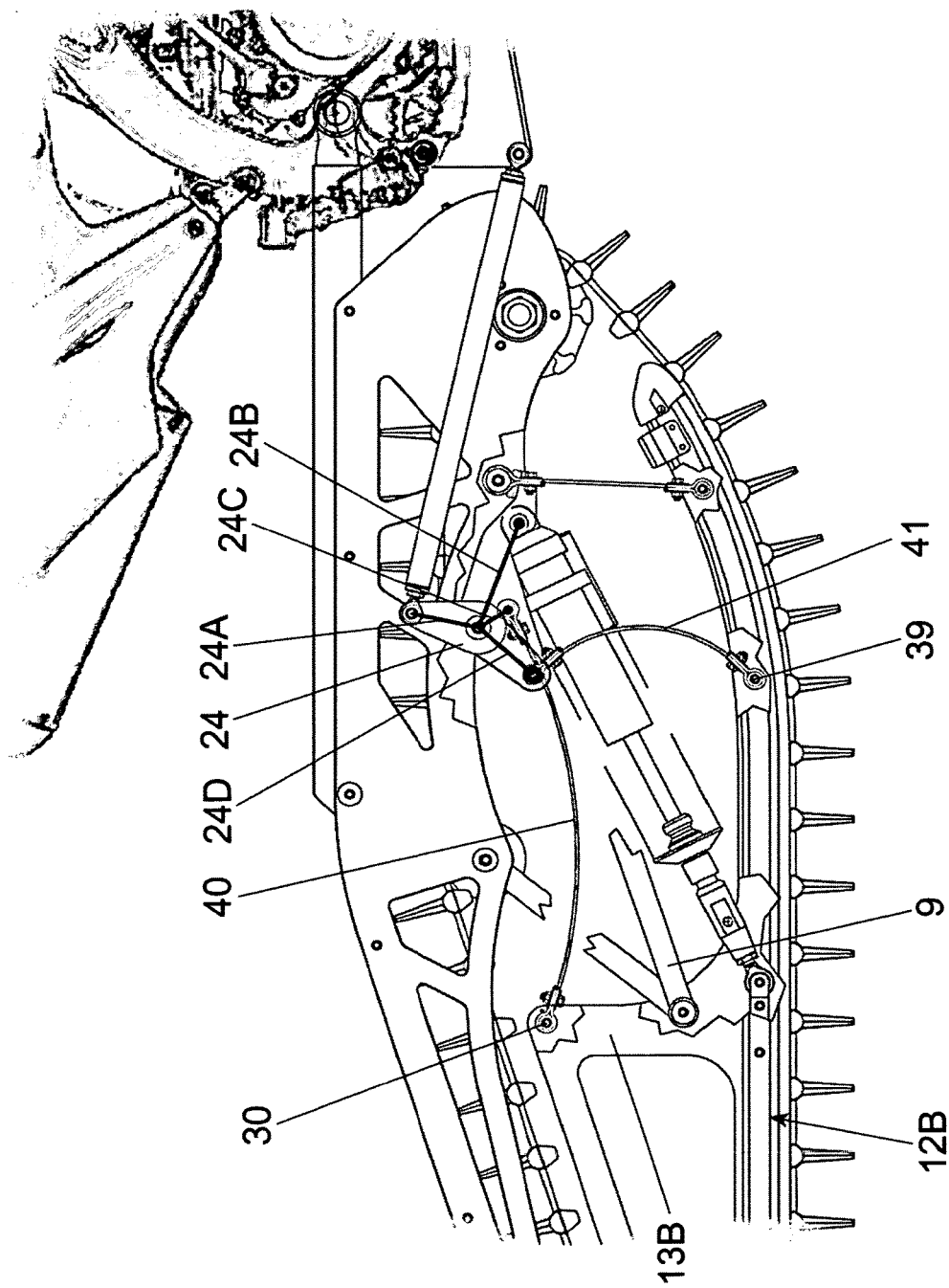
FIG. 10 is a partial right side view of the first embodiment of the present invention illustrating a track attitude angle inclination and declination limiter mechanism employing flexible length-limited members between the bell crank arms and the track skid.

Yet another variation of the first embodiment of the present invention as previously disclosed in FIGS. 1-6 is illustrated in FIG. 10. This drawing is illustrated with a portion of right track rail 13B cut away to expose the pivot mounts of lower strut frame 9. The center portions of the lower strut frame 9 are also cut away and a portion of right side plate 8R is shown cut away with bell crank arms 24A, 24B, 24C, and 24D illustrated transparent—all for the sake of illustration clarity. In this configuration bell crank 24 now effectively comprises 4 bell crank arms illustrated as arms 24A, 24B, 24C, and 24D. This configuration additionally comprises track rails 13B having the upward extending members previously described in FIG. 7, a track skid inclination limiter strap 40 and a track skid declination limiter strap 41. Track skid inclination limiter strap 40 is a flexible high tensile strength member that is connected between bell crank arm 24C and attitude-leveling pivot mount 30 of track rails 13B. Track declination limiter strap 41 is also one or more high tensile strength flexible members that connect between bell crank arm 24D and pivot mount 39 of track skid 12B. Track skid inclination limiter strap 40 limits the inclination of track skid 12B from level relative to vehicle chassis 4 to a set inclination limit and track skid declination limiter strap 41 limits the declination of track skid 12B from level relative to vehicle chassis 4 to a set angle. The function of this configuration is similar to that of track skid attitude-leveling strut 29 of FIG. 7, though lacking the level-attitude biasing provided by the springs of that configuration.

A second embodiment of the present invention is illustrated in FIGS. 11-18 as a snowbike track carriage and suspension mechanism 51. While this embodiment is structured differently than the first embodiment of the present invention as previously described, the function and operation of this second snowbike conversion kit embodiment are practically identical with comparable structural components having identical functions to those of the first embodiment. To assist the reader in understanding and comparing the commonality of functions of the various components of the two embodiments, the components of this second embodiment have been assigned component designator numbers that are 50 numbers higher than the component designator numbers of the components of the first embodiment having comparable functions. For example, the second embodiment component having a designator number 56 serves the same function as does the first embodiment component having the designator number 6. Likewise component number 63 of the second embodiment is functionally equivalent to component number 13 of the first embodiment, component number 79 functionally equivalent to component number 29 and so forth.

Referring now to the side view illustration of FIG. 11, the alternate structure of this second embodiment will be described. A snowbike track carriage and suspension mechanism 51 is illustrated and described mounted to a chassis 4 of a motorcycle 2 in place of the motorcycle's rear wheel and swingarm. A rigid swingarm frame assembly 56 comprises a swingarm upper frame 57 illustrated in FIG. 11 with the left side member cutaway and its outline indicated using a dotted line to provide better visibility of components being described. Rigid swingarm frame 56 additionally comprises a left side plate 58L (not visible in this view) and a right side plate 58R all solidly affixed together. The rigid swingarm frame assembly 56 has a swingarm chassis pivot 60 that pivotally mounts to the motorcycle chassis 4 and a track skid pivot 61 that pivotally mounts to a track skid 62. Track skid 62 comprises a left track rail 63L (not visible in this view), a right track rail 63R, rear idler wheels 64L (hidden in this view) and 64R, and cross braces and axles as necessary to structurally combine the track rails 63L and 63R and idler wheels 64L and 64R into a rigid track skid assembly. Track skid 62 bears and slides upon a lower run of an endless-loop track 65. Endless-loop track 65 is driven by track drive sprockets 66L (hidden in this view) and 66R mounted on a drive axle 67 that receives motive power from the motorcycle engine and braking force from a brake mechanism (not shown). Drive axle 67 rotates upon bearings mounted to left side plate 58L (not visible) and right side plate 58R of swingarm assembly 56. Endless loop track 65 circulates around track drive sprockets 66L and 66R, rearward beneath track skid 62, around rear idler wheels 64L and 64R and over a pair of upper track support idlers 68 that are mounted on an axle supported between left side plate 58L and right side plate 58R.

Track skid 62 pivots upon track skid pivot 61 allowing the track skid to incline and decline relative to rigid swingarm assembly 56, and thus relative to motorcycle chassis 4. Track rail bumpers 72 are mounted to the forward ends of track rails 63L and 63R and upon rotation of track skid 62 upon track skid pivot 61, contact against upper cross rod 70 to limit the track skid inclination relative to rigid swingarm assembly 56. A track skid limiter strap 69 attaches between a forward end of track skid 62 and upper cross rod 70 to limit the declination of track skid 62 relative to rigid swingarm assembly 56. Track skid pivot 61 is pivotally mounted to track skid 62 at a specific location on track skid 62 such that the path length of the belt of endless-loop track 65 remains nearly constant throughout the entire range of allowed incline/decline motion of track skid 62 under swingarm assembly 56. This specific mounting location of track skid pivot 61 in relationship to the diameters and locations of the axes of rotation of the track drive sprockets 66L and 66R, upper track support idlers 68, the diameter and location of rear idlers 64L and 64R on track skid 62, and the location and curvature of the front of track slides 63L and 63R in combination define the track belt path length and the consistency of that track belt path length through the allowed range of motion of track skid 62 beneath rigid swingarm assembly 56.

Motorcycle 2 and its rider are cushionably supported upon the snowbike track by a track cushion assembly 86 that comprises a shock absorber 73, a primary bell crank 74, and a push rod 75. Referring now to the magnified partial view of FIG. 12, track cushion assembly 86 is illustrated. Primary bell crank 74 comprises bell crank arms 74A and 74B and a primary bell crank fulcrum pivot 74F rotatably mounted between a left vertical member 57L and a right vertical member 57R (transparent in FIGS. 11 and 12 with its outline illustrated with dotted lines) of swingarm upper frame 57. To assist in illustrating the operation and function of track cushion assembly 86, primary bell crank arms 74A and 74B are additionally illustrated with bold lines between the pivot axis of primary bell crank fulcrum pivot 74F and their respective arm pivots to illustrate the angular relationships between these bell crank arms and the components to which they pivotally attach. Push rod 75 connects pivotally between primary bell crank arm 74A and a vehicle suspension mount 55 of motorcycle chassis 4. Shock absorber 73 connects pivotally between primary bell crank arm 74B of primary bell crank 74 and a shock pivot connection 87 to left vertical member 57L and right vertical member 57R (illustrated removed and only visible as a dotted line in this view).

Figure 11:
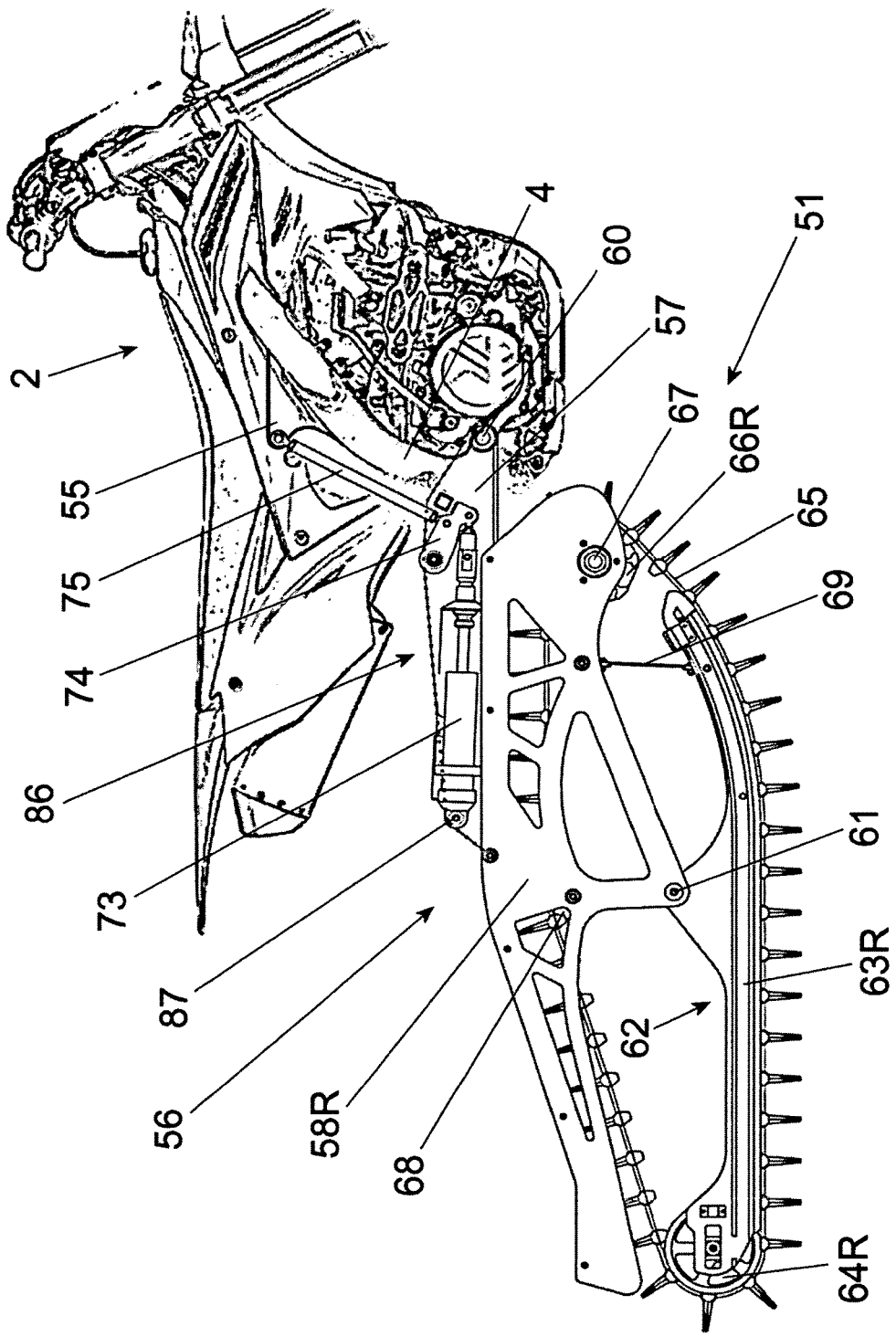
FIG. 11 is a right side view of the second embodiment of the present invention illustrating a prescribed attachment of the second embodiment track carriage and suspension mechanism to the chassis of a motorcycle to convert it to over-snow use wherein the rear wheel and swingarm of the motorcycle are replaced with the second embodiment track carriage and suspension mechanism.
Figure 12:
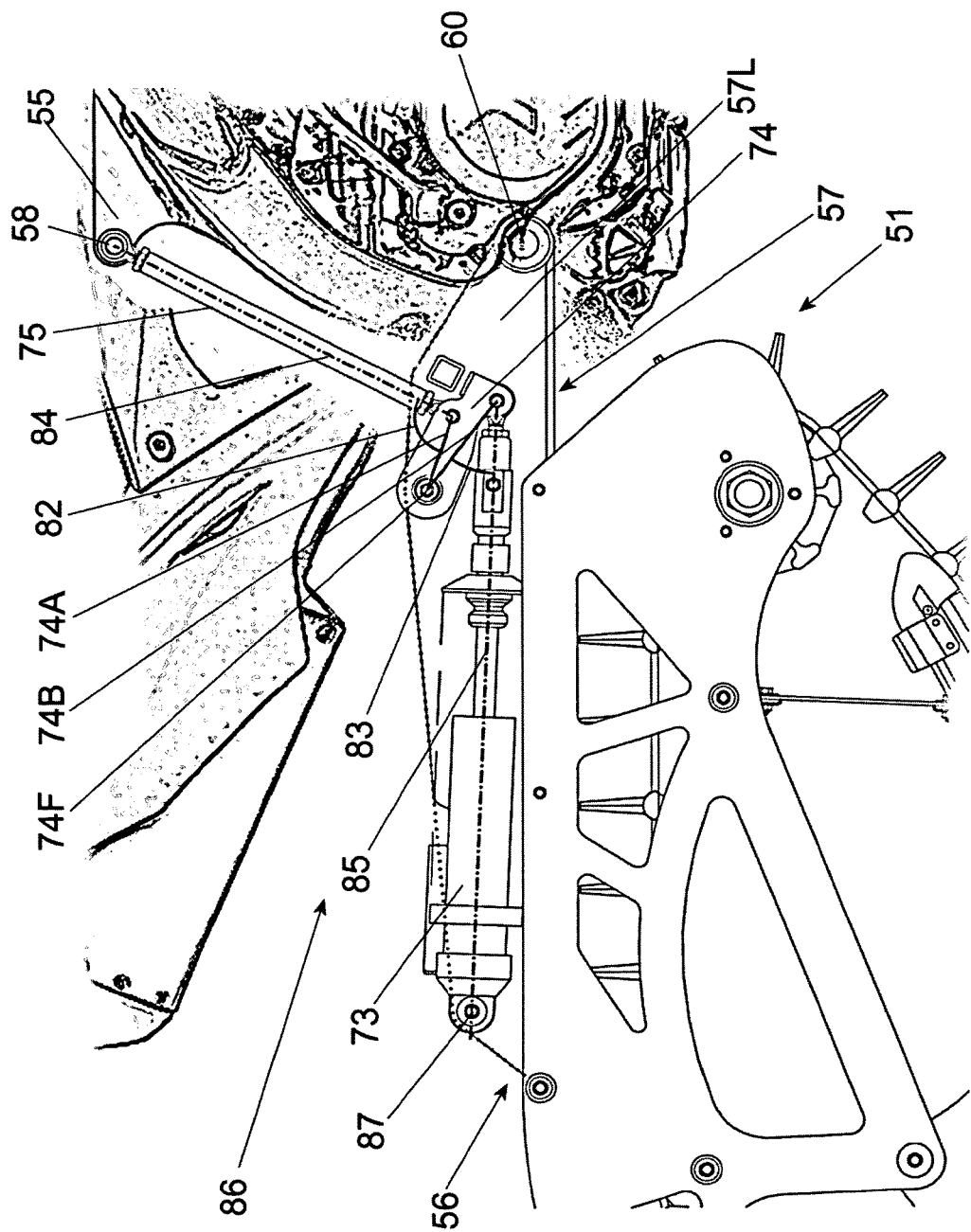
FIG. 12 is a partial right side view of the second embodiment of the present invention illustrating the interconnections and angular relationships between the shock absorber, bell crank and push rod link with the track carriage and suspension extended (unloaded).

As presented in the illustrations of FIGS. 11 and 12, shock absorber 73 is a conventional shock absorber comprising an interior hydraulic dashpot damper mechanism, an external coil spring (illustrated in these Figures with dashed line outlines), internal extension and compression stops, and pivot bearings at each end. Shock absorber 73 could also comprise other variations of construction to serve the same purpose and function of a damped resilient cushion.

In operation, the forces from the mass and inertia of the host motorcycle and rider cause the suspension to become compressed, and are transferred from a frame suspension mount 55 of vehicle chassis 4 through push rod 75 to primary bell crank arm 74A, urging primary bell crank 74 to rotate around its fulcrum 74F to compress against the resilient and damping cushioning forces of shock absorber 73. These forces from shock absorber 73 resist against the rotation of primary bell crank 74 to cause the weight and suspension inertia forces from push rod 75 to be distributed through primary bell crank fulcrum 74F to rigid swingarm assembly 56, thereby transmitting the cushioning forces of shock absorber 73 to rigid swingarm assembly 56. These cushioning forces create a torque couple between swingarm pivot 60 and the fulcrum mount of primary bell crank fulcrum 74F. The resultant torque couple transfers the cushioning forces through rigid swingarm frame assembly 56 to track skid pivot 61, and thereby to track skid 62. Thus, the suspension components of this second embodiment of the invention serve to cushion chassis 4 of the host motorcycle 2 upon a lower run of endless-loop track 65 with a large continuously-progressive suspension range of motion.

Figure 13:
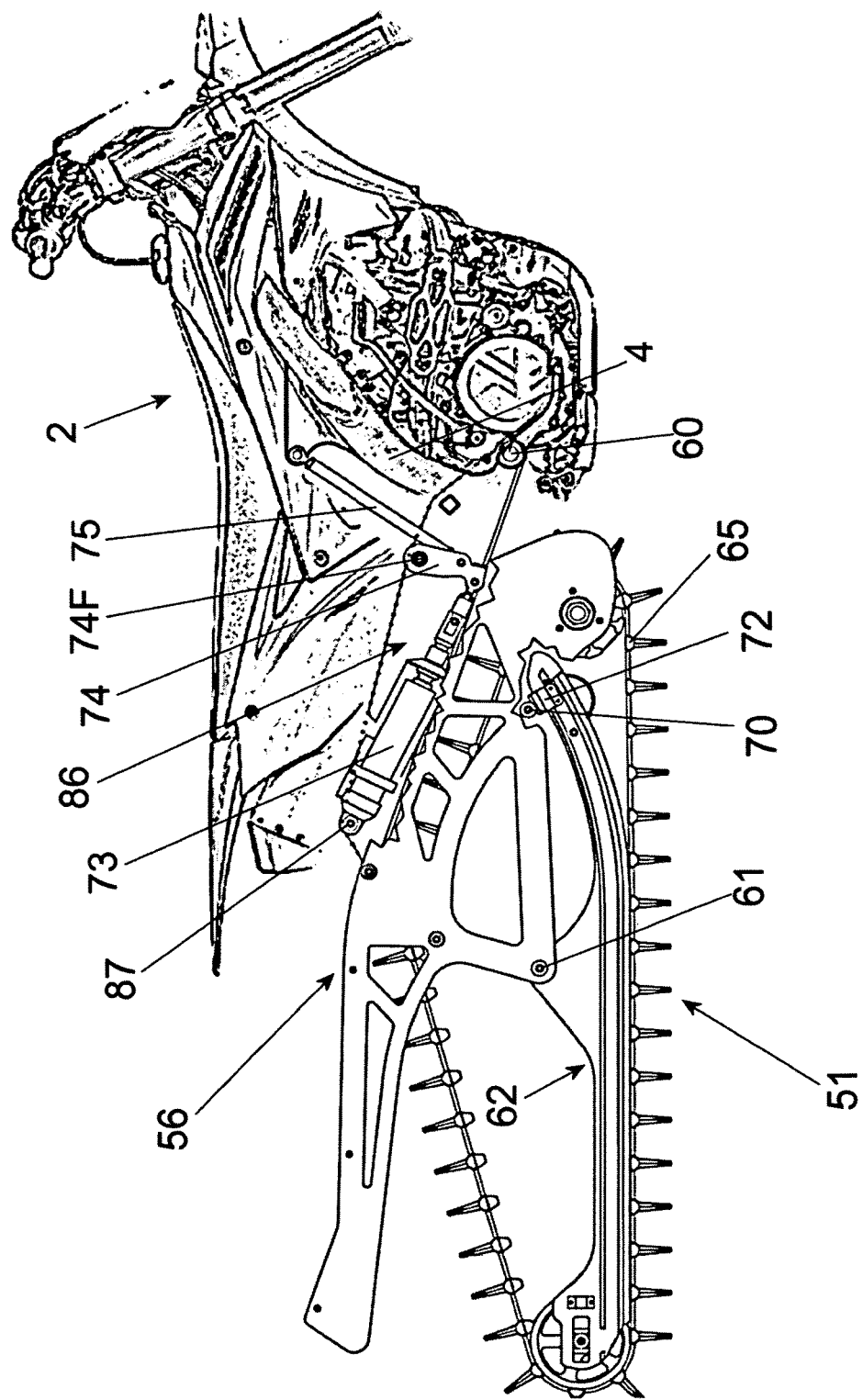
FIG. 13 is a right side view of the second embodiment of the present invention with the track suspension compressed (fully loaded) to provide comparison with the view of FIG. 11 which illustrates the track suspension extended.
Figure 14:
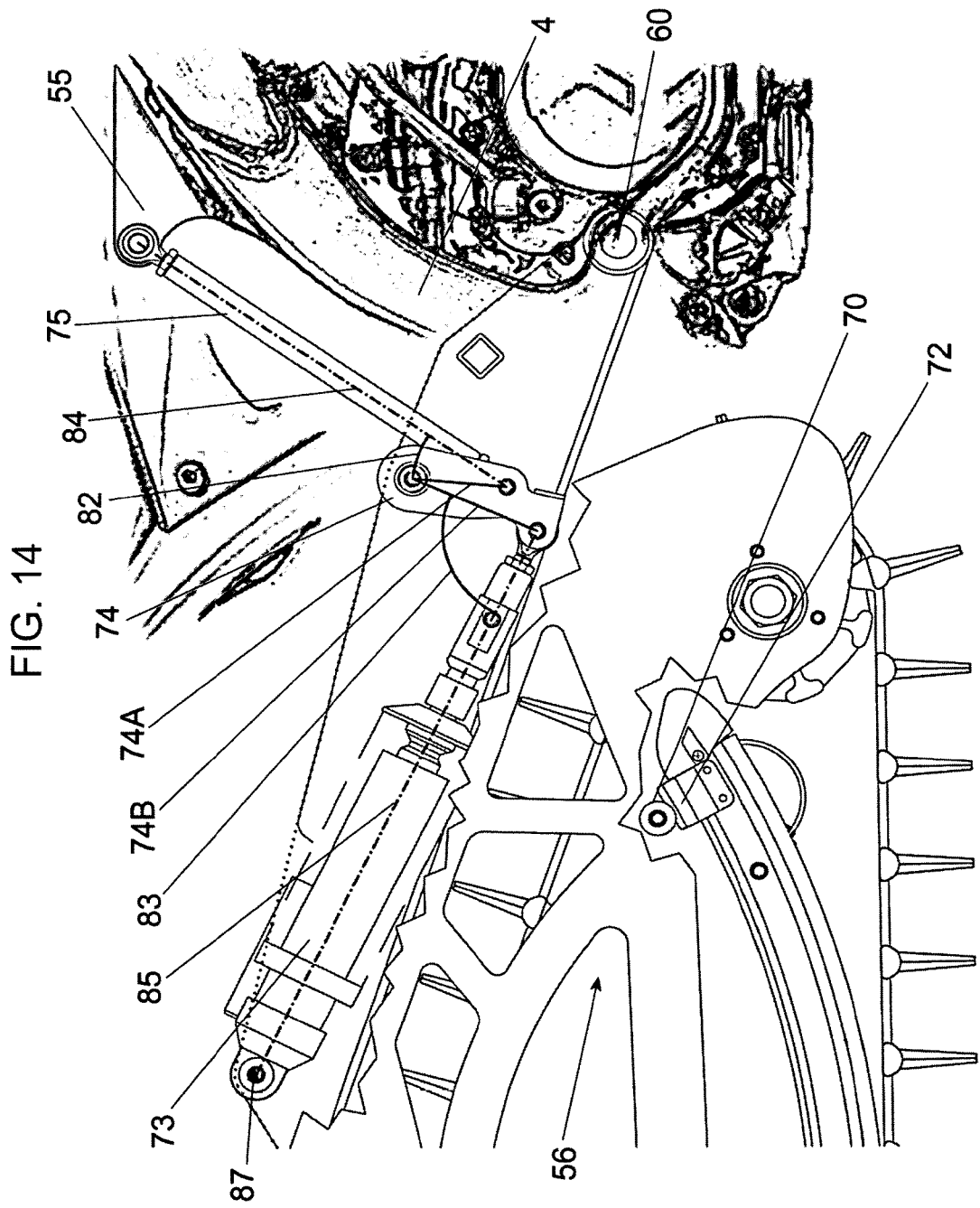
FIG. 14 is a partial right side view of the second embodiment of the present invention illustrating the interconnections and angular relationships between the shock absorber, bell crank and push rod link with the track carriage and suspension fully compressed (loaded) intended to provide comparison to the view of FIG. 12 which illustrates the angular relationships of the interconnections with the track suspension extended.

FIGS. 11 and 12 illustrate snowbike track carriage and suspension mechanism 51 in a fully extended un-weighted orientation. FIGS. 13 and 14 are comparable illustrations showing the snowbike track carriage and suspension mechanism 51 fully compressed or "bottomed" as would occur in landing of the snowbike vehicle from a large jump. As illustrated in FIGS. 13 and 14, track skid 62 has inclined below rigid swingarm assembly 56 to the extent that track rail bumpers 72 of track skid 62 are in contact with upper cross-rod 70.

The continuously-rising suspension rate (or progressive rate) of the track suspension is the increasing rate of compression of shock absorber 73 relative to the amount of compression of the suspension of the vehicle upon the ground contacting run of endless-loop track 65. That is, the change in the amount of compression of shock absorber 73 for the first inch of compression of the track suspension is proportionally less than the change in the amount of compression of shock absorber 73 for the last inch of compression of the track suspension. Such a continuous rising-rate suspension is desirable to provide a plush comfortable ride while resisting harsh bottoming of the track suspension and, as in the first embodiment, can be configured to closely emulate the progressive rate of the rear wheel suspension of the host motorcycle.

Referring to FIG. 12, this continual rising-rate results from the initial angles and subsequent changes in angles between the primary bell crank arm 74A (illustrated with a bold line) and a central axis 84 of push rod 75, and between primary bell crank arm 74B (also illustrated with a separate bold line) and the compression axis 85 of shock absorber 73. When the track suspension is unweighted, the geometric angle 82 between primary bell crank arm 74A and the longitudinal axis of push rod 75 is nearly a right angle (90 degrees). Also, the geometric angle 83 between primary bell crank arm 74B and the compression axis 85 of shock absorber 73 is acute (much less than 90 degrees). Referring to FIGS. 13 and 14, as the track suspension becomes compressed under the weight and inertia of the vehicle and rider, swingarm assembly 56 rotates upward upon swingarm pivot 60, thereby causing push rod 75 to force primary bell crank 74 to rotate clockwise (as viewed in FIGS. 13 and 14). As primary bell crank 74 rotates, geometric angle 82 decreases and geometric angle 83 increases. Thus, the rate of angular rotation of primary bell crank 74 in proportion to the rate of angular rotation of swingarm assembly 56 on its pivotal attachment 60 to chassis 4 increases with the compression of the track suspension. Additionally, as primary bell crank 74 is forced to rotate, the rate of compression of shock absorber 73 relative to the rate of angular rotation of primary bell crank 74 also increases because geometric angle 83 becomes decreasingly acute. The increase in the rate of compression of shock absorber 73 relative to the rate of angular rotation of primary bell crank 74 combined with the increasing rate of angular rotation of primary bell crank 74 in proportion to the rate of angular rotation of swingarm assembly 56 upon swingarm pivot 60 results in a rate of compression of shock absorber 73 in relative proportion to the rate of rotation of swingarm assembly 56 that progressively increases as the vehicle track suspension is compressed. As illustrated in FIG. 14, when the track suspension is bottomed, geometric angle 82 has become severely acute and geometric angle 83 approaches a right angle.

Figure 15:
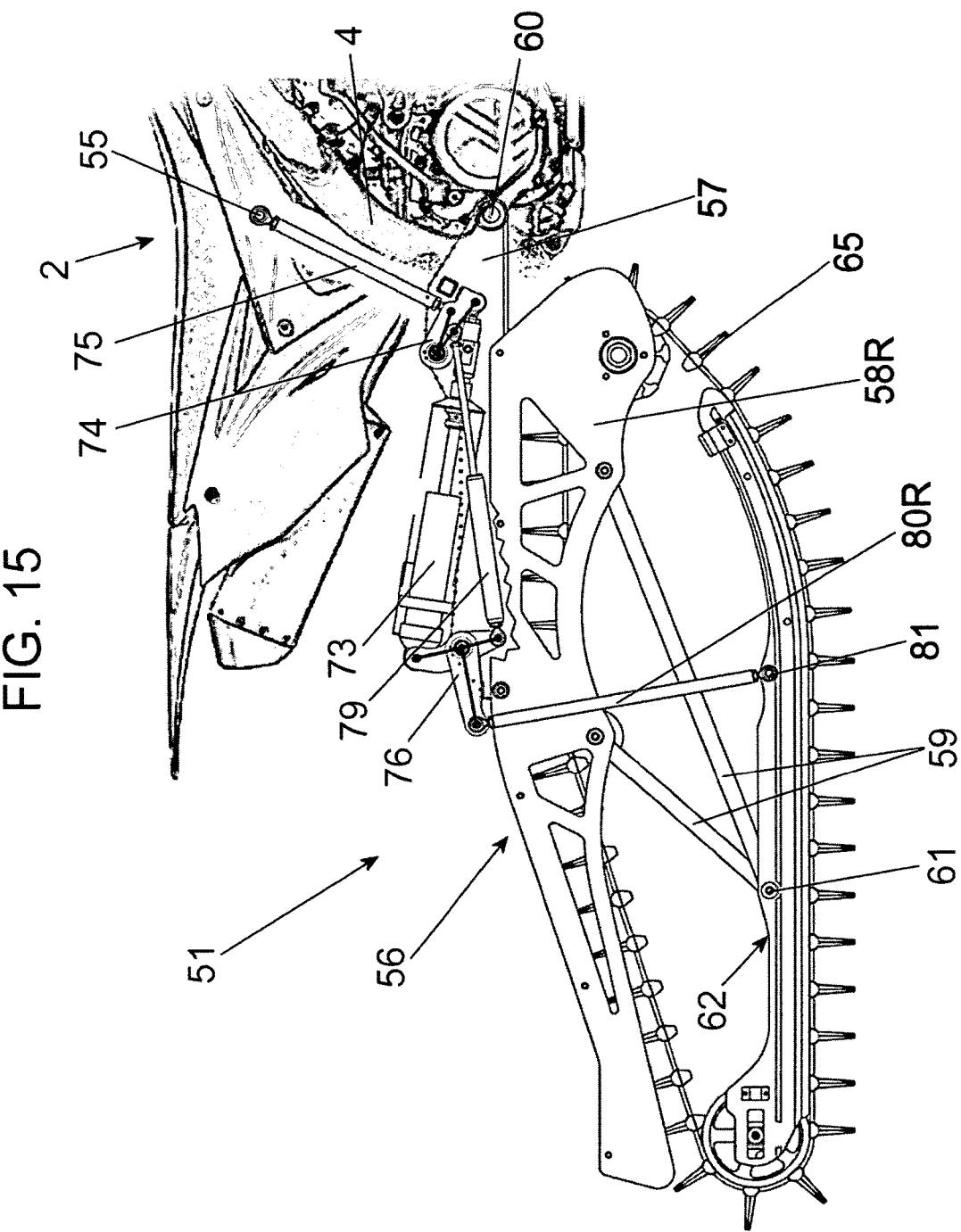
FIG. 15 is a right side view of the second embodiment of the present invention additionally illustrating an improvement that additionally comprises a second bellcrank with the shock absorber and track attitude-leveling mechanism connecting between the two bell cranks and suspension push rods connected between the second bell crank and the forward portion of the track skid.
Figure 16:
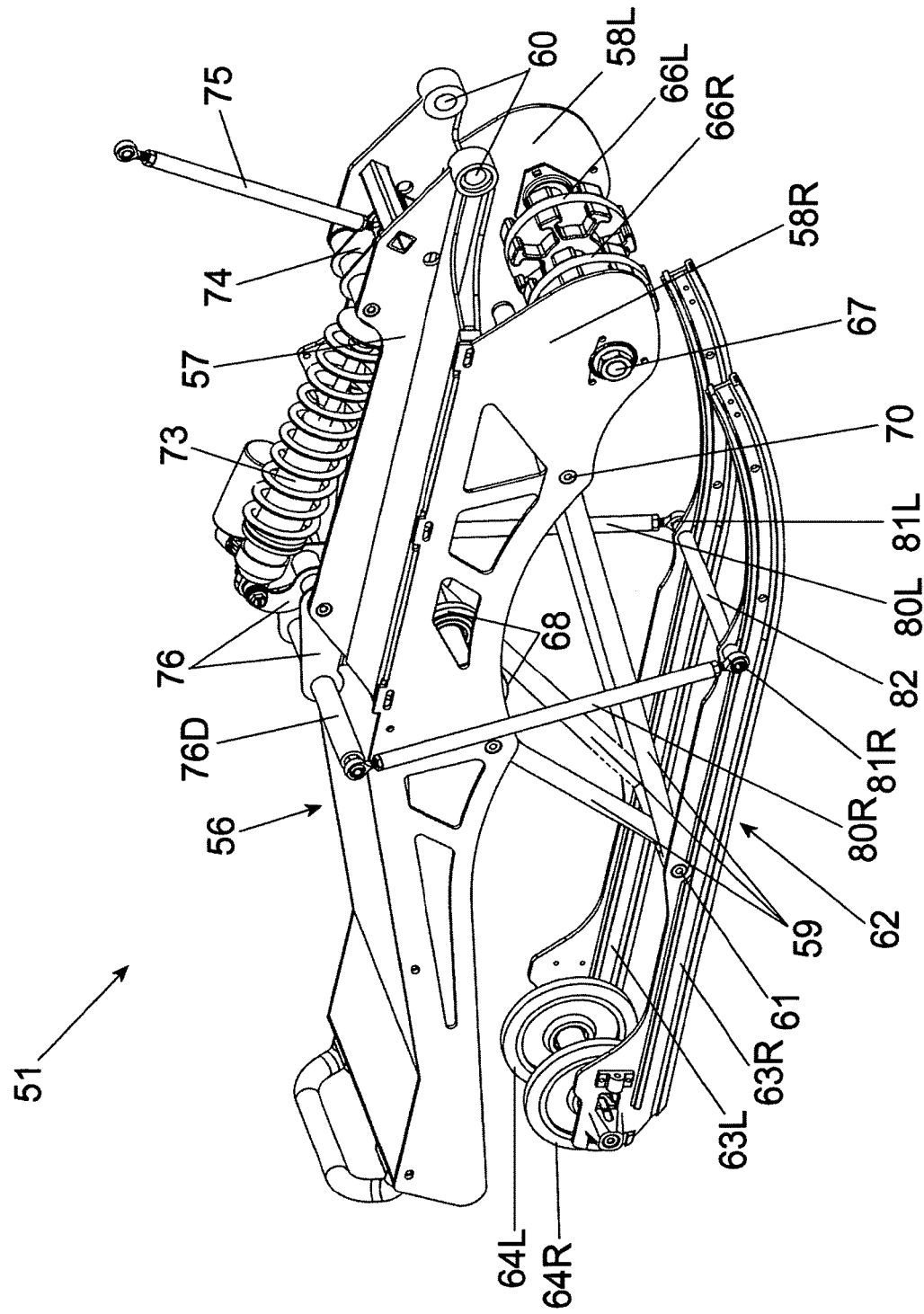
FIG. 16 is an isometric view of the second embodiment of the present invention illustrating the track carriage and suspension mechanism including the added improvement illustrated in the side view of FIG. 15 and with the track removed to allow better visibility of the functional components of this embodiment variation.
Figure 17:
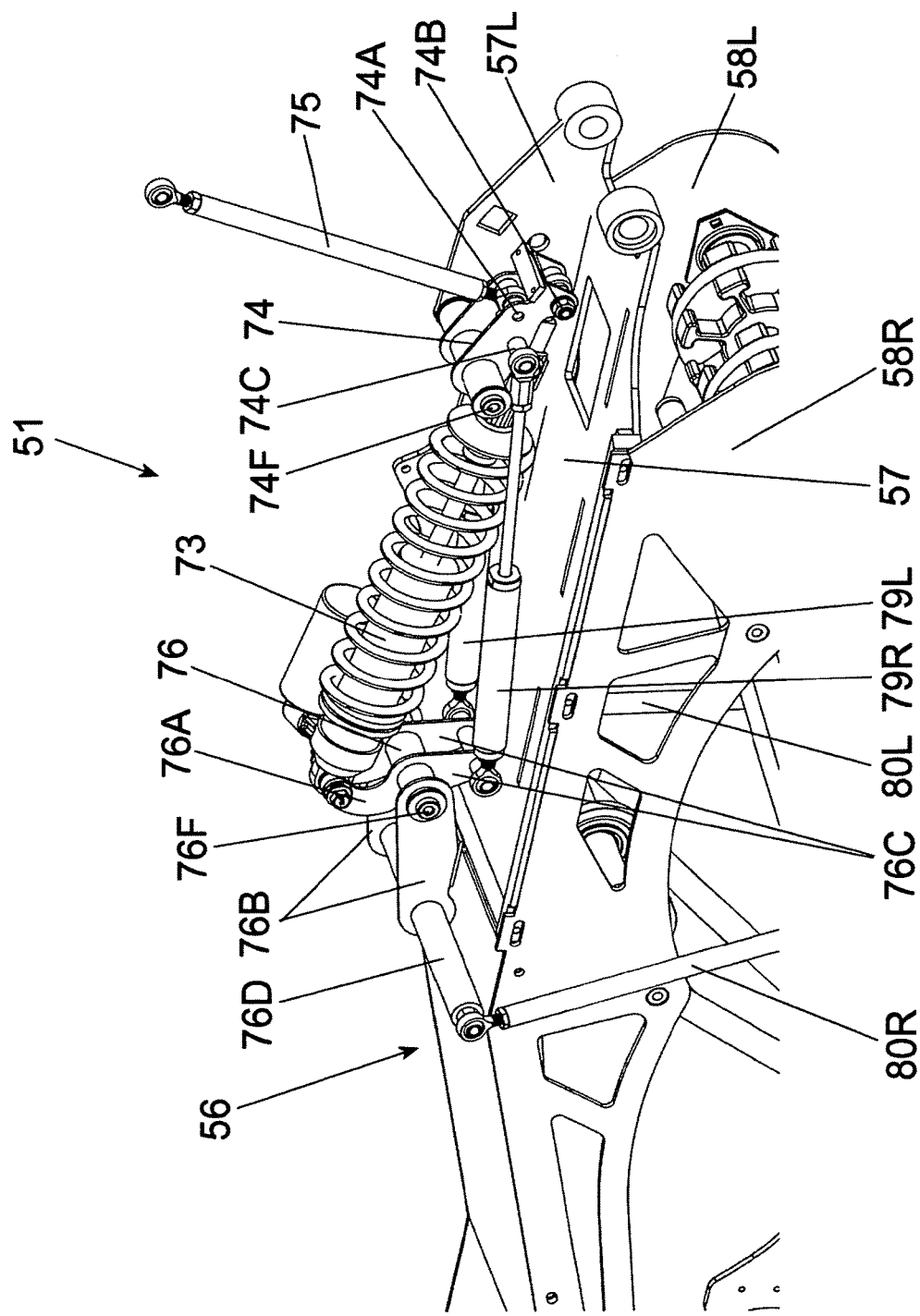
FIG. 17 in a partial isometric view of the second embodiment of the present invention illustrated with a right side member of the upper swingarm frame removed to allow better visibility of the pivotal mountings of the two bell cranks to the upper swingarm frame and their interconnections to the shock absorber and track attitude leveling mechanisms.
Figure 18:
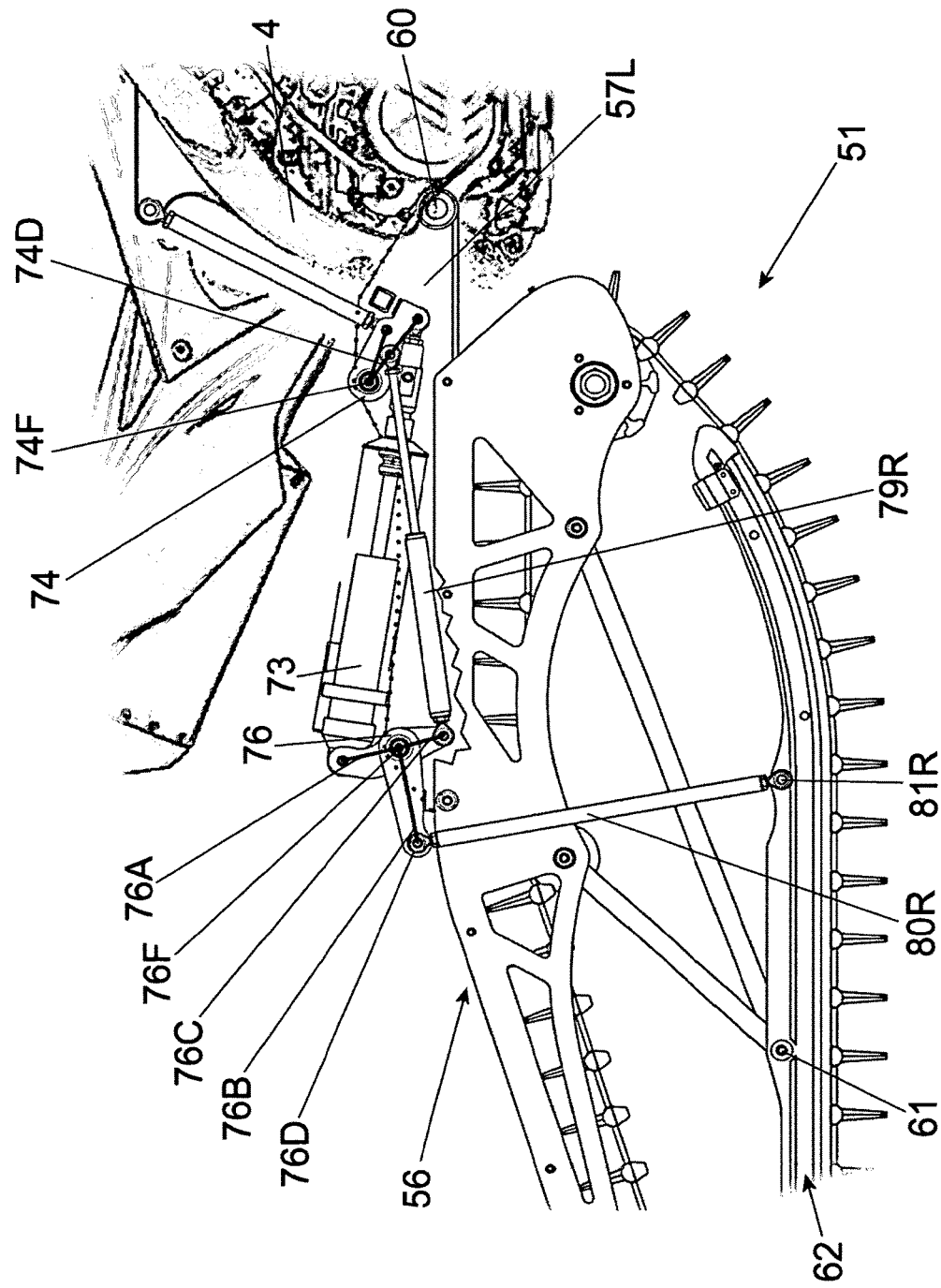
FIG. 18 is a partial right side view of the second embodiment of the present invention illustrated in the isometric views of FIGS. 16 and 17, also with the upper right swingarm frame removed and the outer right side plate shown cut away to expose the two bell cranks with their connections to the shock absorber and the track attitude-leveling mechanisms, the connection of the first bell crank to the vehicle chassis suspension mount and the connection of the second bell crank to the track skid.

An variation to this second embodiment of the present invention providing some improvement of function is illustrated in the right side view of FIG. 15 and the isometric view of FIG. 16. As in previous drawings, shock absorber 73 is shown with its external coil simply illustrated using a dashed line outline in FIG. 15, whereas the isometric view of FIG. 16 properly illustrates the coil spring of shock absorber 73. Snowbike track carriage and suspension mechanism 51, as illustrated in FIG. 16 is shown without endless-loop track 65 for the purpose of providing better visibility of components that would otherwise be hidden by endless-loop track 65. As in the previously described second embodiment illustrated in FIGS. 11-14, a rigid swingarm assembly 56 is pivotally connected between vehicle chassis 4 of motorcycle 2 and track skid 62. In this improvement, rigid swingarm assembly 56 additionally comprises a rigid lower strut frame 59 mounted between left side plate 58L and right side plate 58R, and having a track skid pivot 61 that pivotally mounts to track skid 62. It is desirable to locate the pivotal connection of swingarm track pivot 61 to track skid 62 as near to the track 65 as possible to minimize lifting of the front of the snowbike vehicle under hard acceleration and to minimize the "nosing in" of track skid 62 into the snow under hard braking. The improvement herein described allows such desired low location of swingarm track pivot mount 61, but also requires the pivotal connection of swingarm track pivot 61 to track skid 62 to be located further rearward on track skid 62 to obtain a minimally varying track path length throughout the full range of incline and decline rotation of track skid 62 beneath rigid swingarm assembly 56. This requires adding components to distribute a portion of the suspension cushioning and damping forces from shock absorber 73 to the forward end of track skid 62 to achieve a desired more-forward center of the track weighting distribution.

Because shock absorber 73 is located outside the interior of track 65, an additional mechanism is required to transmit the cushioning force of shock absorber 73 to a track skid suspension pivot mount 81 located forward of track skid pivot 61. This force transfer mechanism comprises a secondary bell crank 76 and a pair of track suspension struts 80L and 80R. Secondary bellcrank 76 comprises a secondary bell crank fulcrum 76F and secondary bell crank arms 76A, 76B and optionally 76C. Secondary bell crank fulcrum 76F is rotatably mounted between left vertical member 57L and right vertical member 57R (illustrated removed in FIGS. 17 and 18 to provide visibility of suspension components) of swingarm upper frame 57. Secondary bell crank arm 76B comprises a pair of bell crank arms and a cross-member 76D that extends laterally outboard beyond left side plate 58L and right side plate 58R of rigid swingarm frame assembly 56. Track suspension struts 80L and 80R connect pivotally between the outboard ends of cross-member 76D and track skid suspension pivot mounts 81L and 81R respectively of track skid 62. Instead of shock absorber 73 being mounted to shock pivot connection 86 on rigid swingarm assembly 56 as illustrated in FIGS. 11-14, it here mounts pivotally to secondary bell crank arm 76A.

The resilient cushioning and damping forces resulting from the static and dynamic compression of shock absorber 73 are delivered to secondary bell crank arm 76A of secondary bell crank 76 to urge secondary bell crank 76 to rotate upon its fulcrum pivot 76F to transmit cushioning force through secondary bell crank arm 76B and suspension struts 80L and 80R to track skid 62. Thus, the cushioning force from shock absorber 73 is distributed proportionally to track skid pivot 61 through bell crank 74 and rigid swingarm assembly 56, and to track skid suspension pivots 81L and 81R through bell crank 76 and suspension struts 80L and 80R in a ratio defined by the relative lengths of secondary bell crank arms 76A and 76B and by the separation between track skid pivot 61 and track skid suspension pivots 81L,R. Hence, the forces suspending the rider and vehicle upon the lower run of track 65 can be optimally forward-distributed upon the track footprint by changing the relative length of secondary bell crank arm 76B vs. the length of secondary bell crank arm 76A, and or by changing the location of track skid suspension pivots 81L,R relative to track skid pivot 61. Centering the track weighting distribution upon track 65 forward of track skid pivot 61 causes track carriage and suspension mechanism 61 to react and perform more nearly like the rear wheel of the host motorcycle in turning, landing from jumps, and in traversing terrain with closely-spaced surface undulations ("whoops").

In function and operation, the described first embodiment snowbike track carriage and suspension mechanism 1 illustrated in FIGS. 1-10 and the described second embodiment snowbike track carriage and suspension mechanism 51 illustrated in FIGS. 11-18, though structurally configured differently, function and operate in the same manner. In the first embodiment illustrated in FIGS. 1-4, 6, 7, 9 and 10, shock absorber 23 mounts directly to track skid 12 forward of track skid pivot 11 to force the forward portion of track skid 12 downward around track skid pivot 11. Shock absorber 73 of this variation of the second embodiment as illustrated in FIGS. 15-18 is located external to track 65 and connects and transmits suspension force to track skid 62 forward of track skid pivot 61 via secondary bell crank 76 and suspension struts 80L and 80R. While this second snowbike conversion kit embodiment comprises the additional secondary bell crank 76 and suspension struts 80L and 80R, it has the benefits of placing the shock absorber above and outside of the endless-loop track where it is more isolated from ground snow and debris and the mass of the shock absorber is located closer to the center of gravity of the snowbike.

An additional improvement to this second embodiment snowbike track carriage and suspension mechanism 51 is illustrated in FIGS. 15-18 and comprises two track attitude-leveling struts 79L and 79R, a primary bell crank third bell crank arm 74C of primary bell crank 74, and a secondary bell crank third arm 76C of secondary bell crank 76. Primary bell crank third arm 74C is rigidly integral with primary bell crank 74, and secondary bell crank third arm 76C is rigidly integral with secondary bell crank 76. Track attitude-leveling struts 79L,R connect pivotally between primary bell crank third arm 74C and secondary bell crank third arm 76C and are telescoping members having a minimum compressed lengths and a maximum extended lengths such as the telescoping strut shown as track attitude-leveling strut 29, 79 illustrated in FIG. 8, a hydraulic damper such as hydraulic damper 38 illustrated in FIG. 9, or a combination of both. The purposes and functions of these elements of this second snowbike track carriage and suspension mechanism embodiment are identical to their counterpart first snowbike track carriage and suspension mechanism embodiment elements as previously described and illustrated in FIGS. 7-9.

Figure 8:
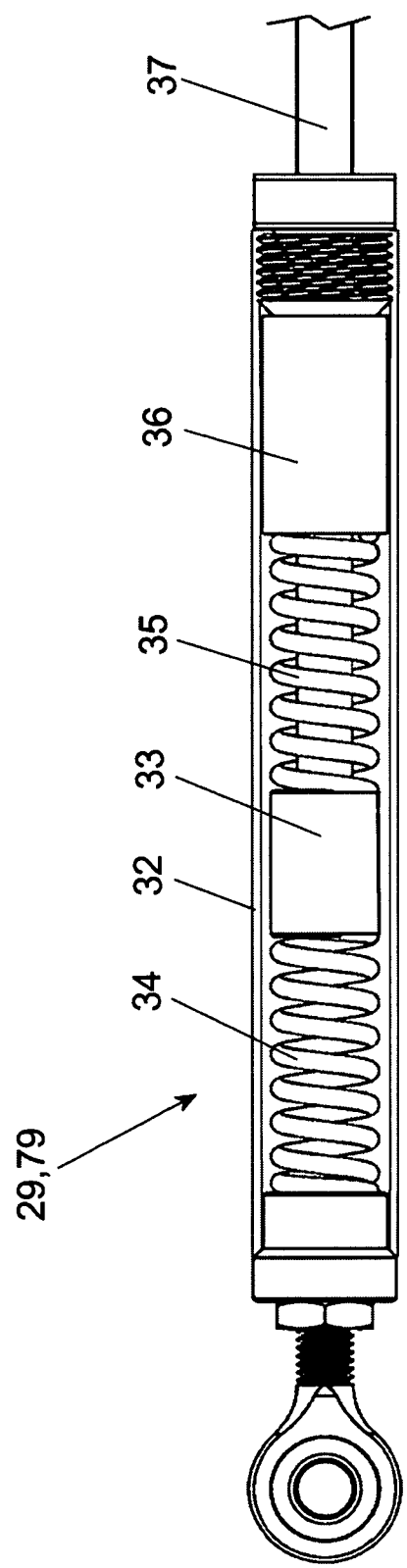
FIG. 8 is a cutaway side view of the track attitude-leveling mechanism illustrating one possible implementation of a telescoping mechanism having a maximum extended length and a minimum compressed length and spring-biased centering.

In operation, as the track suspension becomes compressed, rigid swingarm assembly 56 rotates upward around the pivotal mount of swingarm pivot 60 to motorcycle chassis 4, causing push rod 75 to force primary bell crank 74 to rotate bell crank arm 74C rearward. This biases track attitude-leveling strut 79 rearward against secondary bell crank third arm 76C, thus urging secondary bell crank 76 to rotate against the cushioning force of shock absorber 73, thereby subtracting from the cushioning force from shock absorber 73 that is transmitted through secondary bell crank 76 and suspension struts 80L and 80R to track skid suspension mounts 81L and 81R of track skid 62. If track skid 62 is forward-loaded with the forward end of track skid 62 bearing the load of the snow bike vehicle and rider, this load will tend to force track skid 62 to incline with struts 80L and 80R urging secondary bell crank 76 to oppose the cushioning force of shock absorber 73 and track attitude-leveling strut 79 to extend against its internal extension limiting spring, thus subtracting from the force transmitted through secondary bell crank arm 76A to shock absorber 73. The effect is to bias track skid 62 toward a level attitude or orientation relative to the snowbike vehicle throughout the suspension range of the snowbike track carriage and suspension mechanism 51. If track attitude-leveling strut 79 were implemented as a rigid strut of non-variable length, it would have the effect of forcing track skid 62 to a level angular orientation to snowbike 2 throughout the full suspension range independent of how the track is loaded along its length. However, track attitude-leveling strut 79, by virtue of having a variable length and cushioned compression and extension stops, allows track skid 62 to incline from level by a limited angle as limited by the maximum compression of the internal extension spring 35 (as illustrated in FIG. 8) and to decline from level by a limited angle as limited by the maximum compression of internal compression spring 32 of the track skid attitude-leveling strut 79.

In an embodiment wherein track attitude-leveling strut 79 optionally comprises a hydraulic damper, the effect of the hydraulic damper is to dynamically resist rapid change in the angular attitude of track skid 62 relative to snowbike vehicle 2. The damping resistance from a hydraulic damper embodiment of track attitude-leveling strut 79 to changes in the angular attitude of track skid 62 relative to snowbike vehicle 2 is proportional to the rate of change of the angular attitude of track skid 62 relative to snowbike vehicle 2.

What is claimed is:

1. A track carriage and suspension mechanism for providing cushioned support of a land vehicle upon a lower run of an endless-loop track and delivering motive force to the endless-loop track;
   the land vehicle comprising a chassis swingarm mount and a chassis suspension mount located away from the chassis swingarm mount;
   the track carriage and suspension mechanism comprising
      a track skid,
      an endless-loop track having an upper run and the lower run,
      a swingarm,
      a track drive wheel,
      a rigid strut,
      a bell crank, and
      a shock absorber;
   the track skid comprising
      a track skid frame configured to moveably bear upon an interior surface of the lower run of the endless-loop track,
      a track idler wheel rotatably mounted to a rearward portion of the track skid, and
      a track skid pivot mount located forward of the track idler wheel;
   the swingarm having a rigid framework comprising a swingarm chassis pivot pivotally attached to the chassis swingarm mount,
a swingarm skid pivot pivotally attached to the track skid pivot mount to allow the track skid to incline and decline below the swingarm,
a swingarm bell crank mount,
a left side member, and
a right side member;
the left side member adjacent a lateral left side of the endless-loop track;
the right side member adjacent a lateral right side of the endless-loop track;
the left side member and the right side member both having a rigid connection to the swingarm skid pivot;
the track drive wheel mounted rotatably between the left side member and the right side member;
the endless-loop track configured to wrap and circulate around the track drive wheel, beneath the track skid; and around the track idler wheel;
the track drive wheel drivingly engaging the track;
the bell crank comprising a bell crank fulcrum, a bell crank first arm and a bell crank second arm;
the bell crank fulcrum pivotally mounted to the swingarm bell crank mount;
the rigid strut pivotally connected between the bell crank first arm and the chassis suspension mount;
the shock absorber having a shock absorber first end pivotally attached to the bell crank second arm and a shock absorber second end having a shock absorber pivotal connection to at least one of the swingarm or the track skid.

2. The track carriage and suspension mechanism of claim 1 wherein the shock absorber pivotal connection is a pivotal attachment to the swingarm.

3. The track carriage and suspension mechanism of claim 1 wherein the shock absorber pivotal connection is a pivotal attachment to the track skid.

4. The track carriage and suspension mechanism of claim 3 wherein the pivot axis of the pivotal attachment is displaced from the pivot axis of the track skid pivot mount.

5. The snow vehicle of claim 1 additionally comprising a track upper run support wheel rotatably mounted between the left side member and the right side member rearward of the track drive wheel and supporting the upper run of the endless-loop track;
the endless-loop track wrapping and circulating around the drive wheel, beneath the track skid, around the track skid idler wheel and over the track support wheel; the drive wheel drivingly engaging the endless-loop track.

6. The track carriage and suspension mechanism of claim 1 wherein the track skid pivot mount comprises a left side pivot mount and a right side pivot mount; the left side member pivotally attached to the left side pivot mount and the right side member pivotally attached to the right side pivot mount.

7. The track carriage and suspension mechanism of claim 1 wherein the rigid connection of the left side member and the right side member to the swingarm skid pivot comprises a lower swingarm frame; the left side member rigidly attached to a left side of the lower swingarm frame, the right side member rigidly attached to a right side of the lower swingarm frame and the lower swingarm frame comprising the swingarm skid pivot mount.

8. The track carriage and suspension mechanism of claim 1 additionally comprising a second link, the bell crank additionally comprises a bell crank third arm, and the track skid additionally comprises a track skid third location displaced from the track skid pivot mount; the second link pivotally connecting between the bell crank third arm and the track skid third location.

9. The track carriage and suspension mechanism of claim 8 wherein the second link comprises a telescoping member having a minimum compressed length and a maximum extended length.

10. The track carriage and suspension mechanism of claim 8 wherein the second link comprises a hydraulic damper.

11. The track carriage and suspension mechanism of claim 1 additionally comprising a second link and a third link and wherein the bell crank additionally comprises a third arm and a fourth arm; the track skid additionally comprises a track skid third location displaced from the track skid pivot mount and a track skid fourth location displaced from the track skid pivot mount; the second link connecting between the third arm and the track skid third location and the third link connecting between the fourth arm and the track skid fourth location.

12. The track carriage and suspension mechanism of claim 11 wherein at least one of the second link or the third link is a flexible member having a maximum extended length.

13. The track carriage and suspension mechanism of claim 11 wherein at least one of the second link or the third link is a linkage having a minimum compressed length and a maximum extended length.

14. The track carriage and suspension mechanism of claim 1 wherein the shock absorber pivotal connection is between the shock absorber second end and the track skid and comprises a second bell crank and a suspension connecting link; the second bell crank having a second bell crank fulcrum, a second bell crank first arm and a second bell crank second arm; the second bell crank fulcrum pivotally mounted to the swing arm; the shock absorber second end pivotally connected to the second bell crank first arm and the suspension connecting link pivotally connected between the second bell crank second arm and a track skid suspension mount of the track skid; the track skid suspension mount displaced from the track skid pivot mount.

15. The track carriage and suspension mechanism of claim 14 additionally comprising a second suspension link and wherein the bell crank additionally comprises a bell crank third arm and the second bell crank additionally comprises a second bell crank third arm; the second suspension link pivotally connecting between the bell crank third arm and the second bell crank third arm.

16. The track carriage and suspension mechanism of claim 15 wherein the second suspension link comprises a hydraulic damper.

17. The track carriage and suspension mechanism of claim 15 wherein the second suspension link has at least one of a maximum extended length or a minimum compressed length.

18. A snow vehicle comprising a chassis, one or more steerable skis, an endless-loop track, and a track suspension for cushioned support of the snow vehicle chassis upon a lower run of the endless-loop track;
the chassis comprising a chassis swingarm mount and a chassis shock absorber mount displaced from the chassis swingarm mount;
the track suspension comprising:
a track skid comprising a track skid frame and a track skid idler wheel; the track skid frame having a track skid pivot mount; the track skid configured to moveably bear upon an interior surface of the lower run of the endless-loop track;

a swingarm having a front and a rear; the front of the swingarm pivotally attached to the chassis swingarm mount and the rear of the swingarm pivotally attached to the track skid pivot mount to allow the track skid to longitudinally incline and decline relative to the swingarm;

a drive wheel mounted rotatingly to the swingarm;

a bell crank having a fulcrum, a first arm and a second arm; the fulcrum pivotally attached to the swingarm;

a rigid strut pivotally connected between the first arm of the bell crank and the chassis shock absorber mount;

a shock absorber comprising a hydraulic damper and at least one of a metal spring or a compressible gas cushion, a first end and a second end; the first end pivotally attached to the second arm and the second end having a pivotal connection to at least one of the swingarm or the track skid;

the endless-loop track wrapping and circulating around the drive wheel, beneath the track skid, and around the track skid idler wheel; the drive wheel drivingly engaging the endless-loop track.

19. The snow vehicle of claim 18 wherein the chassis shock absorber mount comprises a pivot mount frame rigidly attached to the chassis of the snow vehicle.

20. The snow vehicle of claim 18 wherein the track skid frame comprises a left track skid frame and a right track skid frame, the left track skid frame and right track skid frame rigidly joined by one or more cross members; the track skid idler wheel rotatably mounted to a rearward end of the left track skid frame and a rearward end of the right track skid frame; the left track skid frame and the right track skid frame configured to moveably bear upon the lower run of the endless-loop track.

21. The snow vehicle of claim 18 wherein the swingarm is a rigid assembly comprising a pivot frame, a left side member and a right side member; the drive wheel rotatingly mounted between the left side member and the right side member; the pivot frame pivotally attached to the chassis swingarm mount; the left side member attached to a left side of the pivot frame and extending downward past a lateral left side of an upper run of the endless-loop track and the right side member attached to the right side of the pivot frame and extending downward past a lateral right side of the upper run of the endless-loop track; the left side member and the right side member mounting to at least one of the track skid pivot mount or a lower pivot frame that attaches pivotally to the track skid pivot mount.

22. The snow vehicle of claim 18 wherein the track skid additionally comprises a track skid suspension mount displaced from the track skid pivot mount and the pivotal connection of the second end of the shock absorber comprises a second bell crank and a connecting link; the second bell crank having a fulcrum pivot, a primary second bell crank arm and a secondary second bell crank arm; the fulcrum pivot pivotally attached to the swing arm, the primary second bell crank arm pivotally attached to the second end of the shock absorber and the connecting link pivotally connecting between the secondary second bell crank arm and the track skid suspension mount.

23. The snow vehicle of claim 18 wherein the track skid frame additionally comprises a track suspension mount displaced from the track skid pivot mount and the pivotal connection of the second end of the shock absorber is a pivotal attachment to the track skid suspension mount.

24. The snow vehicle of claim 18 additionally comprising a track support wheel rotatably mounted between the left side member and the right side member rearward of the track drive wheel and supporting the upper run of the endless-loop track;

the track wrapping and circulating around the drive wheel, beneath the track skid, around the track skid idler wheel and over the track support wheel; the drive wheel drivingly engaging the track.

25. A track conversion mechanism for converting a motorcycle to over snow use wherein the rear wheel and swingarm of the motorcycle are replaced with the track conversion mechanism; the motorcycle having a chassis comprising a chassis swingarm mount and a chassis suspension mount displaced from the chassis swingarm mount;

the track conversion mechanism comprising:

an endless-loop track;

a track skid comprising a track skid frame and a track skid idler wheel; the track skid frame having a track skid pivot mount, the track skid configured to moveably bear upon an interior surface of the lower run of the endless-loop track;

a rigid swingarm comprising a forward pivot, a left side member and a right side member; the forward pivot pivotally attached to the chassis swingarm mount; the left side member extending downward past a lateral left side of the endless-loop track and the right side member extending downward past a lateral right side of the endless-loop track; the left side member and the right side member mounting to at least one of the track skid pivot mount or a lower pivot frame attached pivotally to the track skid pivot mount operative to allow the track skid to longitudinally incline and decline under the rigid swingarm;

a drive wheel mounted rotatingly between the left side member and the right side member;

the endless-loop track wrapping and circulating around the drive wheel, beneath the track skid and around the track skid idler wheel;

the drive wheel drivingly engaging the endless-loop track;

a bell crank having a fulcrum, a first arm and a second arm; the fulcrum pivotally attached to the swingarm;

a rigid strut pivotally connected between the first arm and the chassis suspension mount;

a shock absorber comprising a hydraulic damper and at least one of a metal spring or a compressible gas cushion, a first end and a second end; the first end pivotally attached to the second arm and the second end having a pivotal connection to at least one of the swingarm or the track skid.

26. The track conversion mechanism of claim 25 wherein the chassis suspension mount comprises a suspension frame rigidly attached to the chassis; the suspension frame comprising a suspension pivot mount displaced from the chassis swingarm mount.

27. The snow vehicle of claim 25 wherein the track skid frame additionally comprises a track skid suspension mount displaced from the track skid pivot mount and the pivotal connection of second end of the shock absorber is a pivotal attachment to the track skid suspension mount.

28. The track carriage and suspension mechanism of claim 25 wherein the track skid additionally comprises a track skid suspension mount displaced from the track skid pivot mount and the pivotal connection of the second end of the shock absorber to the track skid comprises a second bell crank and a suspension connecting link; the second bell crank having a second bell crank fulcrum, a second bell crank first arm and a second bell crank second arm; the second bell crank fulcrum pivotally mounted to the swing arm; the shock absorber second end pivotally attached to the second bell crank first arm and the suspension connecting link pivotally connected between the second bell crank second arm and the track skid suspension mount.

29. The snow vehicle of claim 25 additionally comprising a track support wheel rotatably mounted between the left side member and the right side member rearward of the track drive wheel and supporting the upper run of the track;

the track wrapping and circulating around the drive wheel, beneath the track skid, around the track skid idler wheel and over the track support wheel; the drive wheel drivingly engaging the track.

\* \* \* \* \*